United States Patent
Tsuda et al.

(10) Patent No.: US 12,459,176 B2
(45) Date of Patent: *Nov. 4, 2025

(54) INJECTION-MOLDED BODY AND PRODUCTION METHOD THEREFOR

(71) Applicant: DAIKIN INDUSTRIES, LTD., Osaka (JP)

(72) Inventors: Hayato Tsuda, Osaka (JP); Hiroyuki Hamada, Osaka (JP); Tadaharu Isaka, Osaka (JP); Yukari Yamamoto, Osaka (JP); Yumi Zenke, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 84 days.

This patent is subject to a terminal disclaimer.

(21) Appl. No.: 18/450,590

(22) Filed: Aug. 16, 2023

(65) Prior Publication Data

US 2023/0390978 A1 Dec. 7, 2023

Related U.S. Application Data

(63) Continuation of application No. PCT/JP2022/003642, filed on Jan. 31, 2022.

(30) Foreign Application Priority Data

Feb. 26, 2021 (JP) .................................. 2021-031093
Sep. 30, 2021 (JP) .................................. 2021-162124

(51) Int. Cl.
*B29C 45/00* (2006.01)
*B29C 45/78* (2006.01)
(Continued)

(52) U.S. Cl.
CPC .......... *B29C 45/0001* (2013.01); *B29C 45/78* (2013.01); *B29K 2027/12* (2013.01); *B29K 2027/18* (2013.01); *B29K 2995/0012* (2013.01)

(58) Field of Classification Search
CPC .... B29C 2045/0027; B29C 2045/0029; B29C 2045/0037; B29C 2045/0049;
(Continued)

(56) References Cited

U.S. PATENT DOCUMENTS 3,635,926 A 1/1972 Gresham et al.
3,945,786 A 3/1976 Bishop
(Continued)

FOREIGN PATENT DOCUMENTS

CN 1599757 A 3/2005
CN 103946250 A 7/2014
(Continued)

OTHER PUBLICATIONS

International Search Report dated Jun. 20, 2023 in International Application No. PCT/JP2023/013284.
(Continued)

*Primary Examiner* — Stella K Yi
(74) *Attorney, Agent, or Firm* — Sughrue Mion, PLLC

(57) ABSTRACT

There is provided an injection molded article obtained by injection molding a copolymer using a mold provided with a gate, wherein the copolymer contains tetrafluoroethylene (TFE) unit and a fluoro(alkyl vinyl ether) (FAVE) unit, the content of the fluoro(alkyl vinyl ether) unit of the copolymer is 5.2 to 6.3% by mass with respect to the whole of the monomer units, the melt flow rate at 372° C. of the copolymer is 19.0 to 35.0 g/10 min, the number of functional groups of the copolymer is 50 or less per $10^6$ main-chain carbon atoms, and the injection molded article has a gate section corresponding to the gate of the mold, and the ratio of the maximum flow length (a) from the gate section of the injection molded article to the average value (b) of the product thickness on the maximum flow length, ((a)/(b)), is 80 to 200.

9 Claims, 2 Drawing Sheets

(51) Int. Cl.
  *B29K 27/12* (2006.01)
  *B29K 27/18* (2006.01)
(58) Field of Classification Search
  CPC ........ B29C 2045/0094; B29C 45/0001; B29C 45/0025; B29C 45/0046; B29C 45/006; B29C 45/0062; B29C 45/03; B29C 45/08; B29C 45/16; B29C 45/1625
  See application file for complete search history.

(56) References Cited

U.S. PATENT DOCUMENTS

| | | | |
|---|---|---|---|
| 4,262,101 | A | 4/1981 | Hartwimmer et al. |
| 4,510,300 | A | 4/1985 | Levy |
| 4,743,658 | A | 5/1988 | Imbalzano et al. |
| 4,902,444 | A | 2/1990 | Kolouch |
| 5,000,875 | A | 3/1991 | Kolouch |
| 5,656,392 | A | 8/1997 | Sano et al. |
| 5,767,198 | A | 6/1998 | Shimizu et al. |
| 5,851,693 | A | 12/1998 | Sano et al. |
| 6,069,215 | A | 5/2000 | Araki et al. |
| 6,096,795 | A | 8/2000 | Abusleme et al. |
| 6,689,833 | B1 | 2/2004 | Bidstrup et al. |
| 6,713,183 | B2 | 3/2004 | Araki et al. |
| 6,740,375 | B1 | 5/2004 | Sagisaka et al. |
| 6,774,196 | B1 | 8/2004 | Taira et al. |
| 11,826,975 | B2 | 11/2023 | Imamura et al. |
| 2002/0011692 | A1 | 1/2002 | Lahijani |
| 2002/0099143 | A1 | 7/2002 | Namura |
| 2003/0013791 | A1 | 1/2003 | Blong et al. |
| 2003/0109646 | A1 | 6/2003 | Kubo et al. |
| 2003/0114615 | A1 | 6/2003 | Sumi et al. |
| 2003/0190530 | A1 | 10/2003 | Yang et al. |
| 2003/0216531 | A1 | 11/2003 | Aten et al. |
| 2004/0072935 | A1 | 4/2004 | Blong et al. |
| 2004/0102572 | A1 | 5/2004 | Kubo et al. |
| 2004/0204536 | A1 | 10/2004 | Miyatani et al. |
| 2004/0260044 | A1 | 12/2004 | Earnest, Jr. et al. |
| 2005/0020792 | A1 | 1/2005 | Aoyama et al. |
| 2007/0112155 | A1 | 5/2007 | Takase et al. |
| 2007/0149734 | A1 | 6/2007 | Sakakibara et al. |
| 2007/0281166 | A1 | 12/2007 | Nishio |
| 2008/0038627 | A1 | 2/2008 | Yamauchi et al. |
| 2008/0114143 | A1 | 5/2008 | Brothers et al. |
| 2009/0038821 | A1 | 2/2009 | Sato et al. |
| 2009/0044965 | A1 | 2/2009 | Kono et al. |
| 2009/0176952 | A1 | 7/2009 | Funaki et al. |
| 2009/0246435 | A1 | 10/2009 | Shimono et al. |
| 2010/0063214 | A1 | 3/2010 | Kasahara et al. |
| 2010/0212929 | A1 | 8/2010 | Ishii et al. |
| 2010/0273047 | A1 | 10/2010 | Kunoike et al. |
| 2010/0314153 | A1 | 12/2010 | Ishii et al. |
| 2010/0314154 | A1 | 12/2010 | Kitahara et al. |
| 2011/0052970 | A1 | 3/2011 | Kurata et al. |
| 2011/0052977 | A1 | 3/2011 | Kurata et al. |
| 2011/0104562 | A1 | 5/2011 | Byun et al. |
| 2011/0203830 | A1 | 8/2011 | Kono et al. |
| 2011/0272173 | A1 | 11/2011 | Shiotsuki et al. |
| 2012/0035329 | A1 | 2/2012 | Isogai et al. |
| 2012/0094169 | A1 | 4/2012 | Kim et al. |
| 2013/0130100 | A1 | 5/2013 | Kurata et al. |
| 2014/0227533 | A1 | 8/2014 | Murakami et al. |
| 2014/0287177 | A1 | 9/2014 | Suda et al. |
| 2014/0378616 | A1 | 12/2014 | Nakano et al. |
| 2015/0041145 | A1 | 2/2015 | Colaianna et al. |
| 2015/0148481 | A1 | 5/2015 | Brothers et al. |
| 2015/0158988 | A1 | 6/2015 | Sawaki et al. |
| 2016/0006004 | A1 | 1/2016 | Ogawa et al. |
| 2016/0108159 | A1 | 4/2016 | Sekiguchi et al. |
| 2016/0272805 | A1 | 9/2016 | Nakanishi et al. |
| 2016/0319089 | A1 | 11/2016 | Imamura et al. |
| 2017/0008986 | A1 | 1/2017 | Isaka et al. |
| 2017/0025204 | A1 | 1/2017 | Chapman et al. |
| 2017/0214037 | A1 | 7/2017 | Uematsu et al. |
| 2017/0260344 | A1 | 9/2017 | Imamura et al. |
| 2018/0009204 | A1 | 1/2018 | Higuchi et al. |
| 2018/0036931 | A1 | 2/2018 | Higuchi et al. |
| 2018/0237566 | A1 | 8/2018 | Aida et al. |
| 2018/0265654 | A1 | 9/2018 | Imamura et al. |
| 2018/0283590 | A1 | 10/2018 | Yokoyama et al. |
| 2019/0134939 | A1 | 5/2019 | Colaianna et al. |
| 2019/0143628 | A1 | 5/2019 | Colaianna et al. |
| 2019/0177453 | A1 | 6/2019 | Isaka et al. |
| 2019/0193315 | A1 | 6/2019 | Miyamoto et al. |
| 2019/0375929 | A1 | 12/2019 | Nishimura et al. |
| 2020/0332037 | A1 | 10/2020 | Isaka et al. |
| 2021/0008827 | A1 | 1/2021 | Colaianna et al. |
| 2021/0008828 | A1 | 1/2021 | Colaianna et al. |
| 2021/0024769 | A1 | 1/2021 | Imamura et al. |
| 2021/0189031 | A1 | 6/2021 | Hintzer et al. |
| 2021/0269568 | A1 | 9/2021 | Imamura et al. |
| 2022/0001657 | A1 | 1/2022 | Kikuchi et al. |
| 2022/0033636 | A1 | 2/2022 | Nishimura et al. |
| 2022/0170573 | A1 | 6/2022 | Imamura et al. |
| 2022/0181689 | A1 | 6/2022 | Isaka et al. |
| 2022/0181698 | A1 | 6/2022 | Isaka et al. |
| 2022/0181729 | A1 | 6/2022 | Isaka et al. |
| 2022/0195088 | A1 | 6/2022 | Imamura et al. |
| 2022/0213996 | A1 | 7/2022 | Imamura et al. |
| 2022/0266485 | A1 | 8/2022 | Tsuda et al. |
| 2022/0278403 | A1 | 9/2022 | Isaka et al. |
| 2023/0227594 | A1 | 7/2023 | Yamamoto et al. |
| 2023/0235107 | A1 | 7/2023 | Isaka et al. |
| 2023/0235159 | A1 | 7/2023 | Isaka et al. |
| 2023/0235160 | A1 | 7/2023 | Isaka et al. |
| 2023/0238627 | A1 | 7/2023 | Isaka et al. |
| 2023/0238628 | A1 | 7/2023 | Zenke et al. |
| 2023/0238629 | A1 | 7/2023 | Isaka et al. |
| 2023/0272136 | A1 | 8/2023 | Zenke et al. |
| 2023/0295356 | A1 | 9/2023 | Isaka et al. |
| 2023/0383031 | A1 | 11/2023 | Isaka et al. |
| 2023/0383032 | A1 | 11/2023 | Isaka et al. |
| 2023/0383033 | A1 | 11/2023 | Zenke et al. |
| 2023/0383034 | A1 | 11/2023 | Isaka et al. |
| 2023/0390977 | A1 | 12/2023 | Hamada et al. |
| 2023/0390978 | A1 | 12/2023 | Tsuda et al. |
| 2023/0390979 | A1 | 12/2023 | Tsuda et al. |
| 2023/0390980 | A1 | 12/2023 | Tsuda et al. |
| 2023/0390981 | A1 | 12/2023 | Tsuda et al. |
| 2023/0391909 | A1 | 12/2023 | Isaka et al. |
| 2023/0391910 | A1 | 12/2023 | Isaka et al. |
| 2023/0391911 | A1 | 12/2023 | Isaka et al. |
| 2023/0391912 | A1 | 12/2023 | Isaka et al. |
| 2023/0391917 | A1 | 12/2023 | Isaka et al. |
| 2023/0391920 | A1 | 12/2023 | Isaka et al. |
| 2023/0391927 | A1 | 12/2023 | Isaka |
| 2023/0391929 | A1 | 12/2023 | Isaka et al. |
| 2023/0391931 | A1 | 12/2023 | Isaka et al. |
| 2023/0391932 | A1 | 12/2023 | Isaka et al. |
| 2023/0391933 | A1 | 12/2023 | Isaka et al. |
| 2023/0392737 | A1 | 12/2023 | Tsuda et al. |
| 2023/0395282 | A1 | 12/2023 | Isaka et al. |
| 2023/0399431 | A1 | 12/2023 | Isaka et al. |
| 2023/0399432 | A1 | 12/2023 | Isaka et al. |
| 2023/0399438 | A1 | 12/2023 | Isaka et al. |
| 2023/0399441 | A1 | 12/2023 | Isaka et al. |
| 2023/0399443 | A1 | 12/2023 | Isaka et al. |
| 2023/0406975 | A1 | 12/2023 | Isaka et al. |
| 2023/0406976 | A1 | 12/2023 | Isaka et al. |
| 2023/0411751 | A1 | 12/2023 | Tsuda et al. |
| 2023/0415387 | A1 | 12/2023 | Hamada et al. |
| 2025/0002728 | A1 | 1/2025 | Zenke et al. |
| 2025/0011488 | A1 | 1/2025 | Isaka et al. |
| 2025/0011490 | A1 | 1/2025 | Isaka et al. |
| 2025/0011494 | A1 | 1/2025 | Isaka et al. |
| 2025/0011496 | A1 | 1/2025 | Yamamoto et al. |
| 2025/0011498 | A1 | 1/2025 | Isaka et al. |
| 2025/0011499 | A1 | 1/2025 | Isaka et al. |
| 2025/0011500 | A1 | 1/2025 | Isaka et al. |

(56) References Cited

U.S. PATENT DOCUMENTS

| | | |
|---|---|---|
| 2025/0019476 A1 | 1/2025 | Isaka et al. |
| 2025/0034302 A1 | 1/2025 | Isaka et al. |

FOREIGN PATENT DOCUMENTS

| | | |
|---|---|---|
| CN | 107428144 A | 12/2017 |
| CN | 110790854 A | 2/2020 |
| CN | 114223086 A | 3/2022 |
| CN | 114258609 A | 3/2022 |
| CN | 116867821 A | 10/2023 |
| EP | 0 220 910 A2 | 5/1987 |
| EP | 0 423 995 A1 | 4/1991 |
| EP | 0 976 544 A1 | 2/2000 |
| EP | 1 462 458 A1 | 9/2004 |
| EP | 4 024 550 A1 | 7/2022 |
| EP | 4 024 575 A1 | 7/2022 |
| EP | 4 223 793 A1 | 8/2023 |
| EP | 4 223 794 A1 | 8/2023 |
| GB | 1210794 A | 10/1970 |
| JP | 48-20788 B1 | 6/1973 |
| JP | 58-132512 A | 8/1983 |
| JP | 58-191127 A | 11/1983 |
| JP | 59-120433 A | 7/1984 |
| JP | 62-104822 A | 5/1987 |
| JP | 1-53167 B2 | 11/1989 |
| JP | 2-129253 A | 5/1990 |
| JP | 3-184209 A | 8/1991 |
| JP | 3-247609 A | 11/1991 |
| JP | 4-357398 A | 12/1992 |
| JP | 6-1902 A | 1/1994 |
| JP | 6-40813 B2 | 6/1994 |
| JP | 6-287405 A | 10/1994 |
| JP | 7-16869 A | 1/1995 |
| JP | 7-112449 A | 5/1995 |
| JP | 7-188337 A | 7/1995 |
| JP | 7-290496 A | 11/1995 |
| JP | 8-207106 A | 8/1996 |
| JP | 8-321287 A | 12/1996 |
| JP | 9-245832 A | 9/1997 |
| JP | 10-87746 A | 4/1998 |
| JP | 10-275604 A | 10/1998 |
| JP | 10-292054 A | 11/1998 |
| JP | 2001-151825 A | 6/2001 |
| JP | 2001-151826 A | 6/2001 |
| JP | 2001-283907 A | 10/2001 |
| JP | 2001-283921 A | 10/2001 |
| JP | 2002-53620 A | 2/2002 |
| JP | 2002-63934 A | 2/2002 |
| JP | 2002-167488 A | 6/2002 |
| JP | 2003-327770 A | 11/2003 |
| JP | 2003-534940 A | 11/2003 |
| JP | 2004-256406 A | 9/2004 |
| JP | 2004-534131 A | 11/2004 |
| JP | 2005-523979 A | 8/2005 |
| JP | 2005-298659 A | 10/2005 |
| JP | 2005-320497 A | 11/2005 |
| JP | 2006-117912 A | 5/2006 |
| JP | 2006-312736 A | 11/2006 |
| JP | 2007-238960 A | 9/2007 |
| JP | 2008-66254 A | 3/2008 |
| JP | 2009-42478 A | 2/2009 |
| JP | 2009-59690 A | 3/2009 |
| JP | 2009-235564 A | 10/2009 |
| JP | 2009-272207 A | 11/2009 |
| JP | 2010-56079 A | 3/2010 |
| JP | 2010-509443 A | 3/2010 |
| JP | 2010-162817 A | 7/2010 |
| JP | 2011-48976 A | 3/2011 |
| JP | 2011-71104 A | 4/2011 |
| JP | 2012-54269 A | 3/2012 |
| JP | 2012-80911 A | 4/2012 |
| JP | 2012-106494 A | 6/2012 |
| JP | 2012-130557 A | 7/2012 |
| JP | 2013-71341 A | 4/2013 |
| JP | 2013-82888 A | 5/2013 |
| JP | 2013-177574 A | 9/2013 |
| JP | 2014-28951 A | 2/2014 |
| JP | 2014-59052 A | 4/2014 |
| JP | 2014-187040 A | 10/2014 |
| JP | 2015-7218 A | 1/2015 |
| JP | 2015-519410 A | 7/2015 |
| JP | 2015-147924 A | 8/2015 |
| JP | 2015-168840 A | 9/2015 |
| JP | 2016-537499 A | 12/2016 |
| JP | 2017-197690 A | 11/2017 |
| JP | 2018-20468 A | 2/2018 |
| JP | 2018-514598 A | 6/2018 |
| JP | 2018-523272 A | 8/2018 |
| JP | 2018-159090 A | 10/2018 |
| JP | 2019-172962 A | 10/2019 |
| JP | 2019-210420 A | 12/2019 |
| JP | 2019-214641 A | 12/2019 |
| JP | 2020-2341 A | 1/2020 |
| JP | 2020-15906 A | 1/2020 |
| JP | 2020-29042 A | 2/2020 |
| JP | 2020-100823 A | 7/2020 |
| JP | 2020-100843 A | 7/2020 |
| JP | 2021-6648 A | 1/2021 |
| JP | 2021-141043 A | 9/2021 |
| JP | 2021-141045 A | 9/2021 |
| JP | 2022-19196 A | 1/2022 |
| KR | 10-2004-0071160 A | 8/2004 |
| KR | 10-2019-0034205 A | 4/2019 |
| WO | 95/29956 A1 | 11/1995 |
| WO | 01/40331 A1 | 6/2001 |
| WO | 03/006566 A1 | 1/2003 |
| WO | 03/048214 A1 | 6/2003 |
| WO | 2004/052987 A1 | 6/2004 |
| WO | 2008/032613 A1 | 3/2008 |
| WO | 2008/047759 A1 | 4/2008 |
| WO | 2008/047906 A1 | 4/2008 |
| WO | 2008/143069 A1 | 11/2008 |
| WO | 2010/113864 A1 | 10/2010 |
| WO | 2013/115374 A1 | 8/2013 |
| WO | 2014/007346 A1 | 1/2014 |
| WO | 2014/129413 A1 | 8/2014 |
| WO | 2015/119053 A1 | 8/2015 |
| WO | 2016/117492 A1 | 7/2016 |
| WO | 2017/056203 A1 | 4/2017 |
| WO | 2017/082417 A1 | 5/2017 |
| WO | 2019/003265 A1 | 1/2019 |
| WO | 2020/004083 A1 | 1/2020 |
| WO | 2020/090981 A1 | 5/2020 |
| WO | 2020/204163 A1 | 10/2020 |
| WO | 2021/033539 A1 | 2/2021 |
| WO | 2021/039862 A1 | 3/2021 |
| WO | 2021/039863 A1 | 3/2021 |
| WO | 2021/039865 A1 | 3/2021 |
| WO | 2021039864 A1 | 3/2021 |
| WO | 2021/059753 A1 | 4/2021 |
| WO | 2022/181225 A1 | 1/2022 |

OTHER PUBLICATIONS

International Search Report dated Jun. 6, 2023 in International Application No. PCT/JP2023/013285.
International Search Report dated Jun. 6, 2023 for International Application No. PCT/JP2023/013289.
International Search Report dated Jun. 20, 2023 for International Application No. PCT/JP2023/013290.
International Search Report dated Jun. 6, 2023 for International Application No. PCT/JP2023/013291.
International Search Report dated Jun. 6, 2023 for International Application No. PCT/JP2023/013292.
International Search Report dated Jun. 6, 2023 for International Application No. PCT/JP2023/013293.
International Search Report dated Jun. 6, 2023 for International Application No. PCT/JP2023/013331.
International Search Report dated Jun. 6, 2023 for International Application No. PCT/JP2023/013332.
International Search Report dated Jun. 6, 2023 for International Application No. PCT/JP2023/013333.

(56) References Cited

OTHER PUBLICATIONS

International Preliminary Report on Patentability, with Translation of Written Opinion issued Sep. 24, 2024 in International Application No. PCT/JP2023/013284.
International Preliminary Report on Patentability, with Translation of Written Opinion issued Sep. 24, 2024 in International Application No. PCT/JP2023/013285.
International Preliminary Report on Patentability, with Translation of Written Opinion issued Sep. 24, 2024 in International Application No. PCT/JP2023/013289.
International Preliminary Report on Patentability, with Translation of Written Opinion issued Sep. 24, 2024 in International Application No. PCT/JP2023/013290.
International Preliminary Report on Patentability, with Translation of Written Opinion issued Sep. 24, 2024 in International Application No. PCT/JP2023/013291.
International Preliminary Report on Patentability, with Translation of Written Opinion issued Sep. 24, 2024 in International Application No. PCT/JP2023/013292.
International Preliminary Report on Patentability, with Translation of Written Opinion issued Sep. 24, 2024 in International Application No. PCT/JP2023/013293.
International Preliminary Report on Patentability, with Translation of Written Opinion issued Sep. 24, 2024 in International Application No. PCT/JP2023/013331.
International Preliminary Report on Patentability, with Translation of Written Opinion issued Sep. 24, 2024 in International Application No. PCT/JP2023/013332.
International Preliminary Report on Patentability, with Translation of Written Opinion issued Sep. 24, 2024 in International Application No. PCT/JP2023/013333.
European Search Report issued Aug. 27, 2024 for European Patent Application No. 21875831.6.
European Search Report issued Aug. 27, 2024 for European Patent Application No. 21875832.4.
European Search Report issued Aug. 29, 2024 for European Patent Application No. 21875833.2.
European Search Report issued Aug. 29, 2024 for European Patent Application No. 21875834.0.
European Search Report issued Sep. 9, 2024 for European Patent Application No. 21875826.6.
European Search Report issued Sep. 9, 2024 for European Patent Application No. 21875828.2.
European Search Report issued Sep. 9, 2024 for European Patent Application No. 21875829.0.
European Search Report issued Sep. 9, 2024 for European Patent Application No. 21875830.8.
European Search Report issued Sep. 10, 2024 for European Patent Application No. 21875835.7.
European Search Report issued Sep. 19, 2024 for European Patent Application No. 21875827.4.
European Search Report issued Dec. 4, 2024 for European Patent Application No. 22759287.0.
European Search Report issued Dec. 5, 2024 for European Patent Application No. 22759265.6.
European Search Report issued Dec. 10, 2024 for European Patent Application No. 22759267.2.
European Search Report issued Dec. 13, 2024 for European Patent Application No. 22 759 272.2.
European Search Report issued Dec. 16, 2024 for European Patent Application No. 22759276.3.
European Search Report issued Dec. 13, 2024 for European Patent Application No. 22759273.0.
European Search Report issued Dec. 19, 2024 for European Patent Application No. 22759264.9.
European Search Report issued Dec. 19, 2024 for European Patent Application No. 22759277.1.
European Search Report issued Jan. 2, 2025 for European Patent Application No. 22759281.3.
European Search Report issued Jan. 3, 2025 for European Patent Application No. 22759261.5.
European Search Report issued Jan. 3, 2025 for European Patent Application No. 22759274.8.
European Search Report issued Jan. 16, 2025 for European Patent Application No. 22759269.8.
European Search Report issued Jan. 14, 2025 for European Patent Application No. 22759282.1.
European Search Report issued Jan. 14, 2025 for European Patent Application No. 22759262.3.
European Search Report issued Jan. 16, 2025 for European Patent Application No. 22759284.7.
European Search Report issued Jan. 27, 2025 for European Patent Application No. 22759268.0.
European Search Report issued Jan. 27, 2025 for European Patent Application No. 22759285.4.
European Search Report issued Feb. 4, 2025 for European Patent Application No. 22759266.4.
Paolo Corbelli, "ASTM D638: tensile test for plastics", Jul. 30, 2024, XP093227725, Retrieved from the Internet: URL:https://www.cermacsrl.com/en/astm-d638-tensile-test-for-plastics/, pp. 1-9 (9 total pages).
Keun Park et al., "Eliminating weldlines of an injection-molded part with the aid of high-frequency induction heating", Journal of Mechanical Science and Technology, vol. 24, No. 1, XP055158055, 2010, pp. 149-152 (4 total pages).
Nanyang Zhao et al., "In situ flow state characterization of molten resin at the inner mold in injection molding", Journal of Applied Polymer Science, John Wiley & Sons, Inc, US, vol. 141, No. 9, XP072571824, 2023, pp. 1-16 (16 total pages).
Translation of the International Search Report issued Oct. 13, 2020 in International Application No. PCT/JP2020/032236.
Translation of the International Search Report issued Oct. 13, 2020 in International Application No. PCT/JP2020/032237.
Translation of the International Search Report issued Oct. 13, 2020 in International Application No. PCT/JP2020/032238.
Translation of the International Search Report issued Oct. 13, 2020 in International Application No. PCT/JP2020/032239.
Translation of the International Search Report issued Oct. 6, 2020 in International Application No. PCT/JP2020/032234.
International Preliminary Report on Patentability, with Translation of Written Opinion issued Mar. 1, 2022 in International Application No. PCT/JP2020/032238.
International Preliminary Report on Patentability, with Translation of Written Opinion issued Mar. 1, 2022 in International Application No. PCT/JP2020/032239.
International Preliminary Report on Patentability, with Translation of Written Opinion issued Mar. 1, 2022 in International Application No. PCT/JP2020/032236.
International Preliminary Report on Patentability, with Translation of Written Opinion issued Mar. 1, 2022 in International Application No. PCT/JP2020/032237.
International Preliminary Report on Patentability, with Translation of Written Opinion issued Mar. 1, 2022 in International Application No. PCT/JP2020/032234.
Translation of the International Search Report dated Dec. 21, 2021 in International Application No. PCT/JP2021/036301.
Translation of the International Search Report dated Dec. 21, 2021 in International Application No. PCT/JP2021/036302.
Translation of the International Search Report dated Dec. 21, 2021 in International Application No. PCT/JP2021/036303.
Translation of the International Search Report dated Nov. 9, 2021 in International Application No. PCT/JP2021/036304.
Translation of the International Search Report dated Apr. 12, 2022 in International Application No. PCT/JP2022/003643.
Translation of the International Search Report dated Nov. 1, 2021 in International Application No. PCT/JP2021/036305.
Translation of the International Search Report dated Nov. 22, 2021 in International Application No. PCT/JP2021/036306.
Translation of the International Search Report dated Nov. 22, 2021 in International Application No. PCT/JP2021/036307.
Translation of the International Search Report dated Nov. 22, 2021 in International Application No. PCT/JP2021/036308.

(56) References Cited

OTHER PUBLICATIONS

Translation of the International Search Report dated Nov. 22, 2021 in International Application No. PCT/JP2021/036309.
Translation of the International Search Report dated Nov. 22, 2021 in International Application No. PCT/JP2021/036310.
Translation of the International Search Report dated Apr. 19, 2022 in International Application No. PCT/JP2022/003634.
Translation of the International Search Report dated Apr. 19, 2022 in International Application No. PCT/JP2022/003636.
Translation of the International Search Report dated Apr. 5, 2022 in International Application No. PCT/JP2022/003637.
Translation of the International Search Report dated Apr. 5, 2022 in International Application No. PCT/JP2022/003638.
Translation of the International Search Report dated Apr. 5, 2022 in International Application No. PCT/JP2022/003640.
Translation of the International Search Report dated Apr. 5, 2022 in International Application No. PCT/JP2022/003641.
Translation of the International Search Report dated Apr. 12, 2022 in International Application No. PCT/JP2022/003642.
Translation of the International Search Report dated Apr. 19, 2022 in International Application No. PCT/JP2022/003644.
Translation of the International Search Report dated Apr. 19, 2022 in International Application No. PCT/JP2022/003645.
Translation of the International Search Report dated Apr. 12, 2022 in International Application No. PCT/JP2022/003646.
Translation of the International Search Report dated Apr. 12, 2022 in International Application No. PCT/JP2022/003647.
Translation of the International Search Report dated Mar. 8, 2022 in International Application No. PCT/JP2022/003648.
Translation of the International Search Report dated Apr. 19, 2022 in International Application No. PCT/JP2022/003649.
Translation of the International Search Report dated Apr. 19, 2022 in International Application No. PCT/JP2022/003650.
Translation of the International Search Report dated Apr. 19, 2022 in International Application No. PCT/JP2022/003651.
Translation of the International Search Report dated Mar. 22, 2022 in International Application No. PCT/JP2022/003652.
Translation of the International Search Report dated Apr. 19, 2022 in International Application No. PCT/JP2022/003653.
Translation of the International Search Report dated Apr. 19, 2022 in International Application No. PCT/JP2022/003654.
Translation of the International Search Report dated Mar. 22, 2022 in International Application No. PCT/JP2022/003657.
Translation of the International Search Report dated Mar. 22, 2022 in International Application No. PCT/JP2022/003658.
Translation of the International Search Report dated Apr. 19, 2022 in International Application No. PCT/JP2022/003659.
Translation of the International Search Report dated Mar. 8, 2022 in International Application No. PCT/JP2022/003660.
Translation of the International Search Report dated Mar. 15, 2022 in International Application No. PCT/JP2022/003661.
Translation of the International Search Report dated Apr. 19, 2022 in International Application No. PCT/JP2022/003664.
Translation of the International Search Report dated Apr. 19, 2022 in International Application No. PCT/JP2022/003665.
Translation of the International Search Report dated May 24, 2022 in International Application No. PCT/JP2022/007735.
Translation of the International Search Report dated May 17, 2022 in International Application No. PCT/JP2022/007737.
Translation of the International Search Report dated May 10, 2022 in International Application No. PCT/JP2022/007738.
Translation of the International Search Report dated Apr. 19, 2022 in International Application No. PCT/JP2022/003635.
International Preliminary Report on Patentability, with Translation of Written Opinion issued Mar. 28, 2023 in International Application No. PCT/JP2021/036301.
International Preliminary Report on Patentability, with Translation of Written Opinion issued Mar. 28, 2023 in International Application No. PCT/JP2021/036302.
International Preliminary Report on Patentability, with Translation of Written Opinion issued Mar. 28, 2023 in International Application No. PCT/JP2021/036303.
International Preliminary Report on Patentability, with Translation of Written Opinion issued Mar. 28, 2023 in International Application No. PCT/JP2021/036304.
International Preliminary Report on Patentability, with Translation of Written Opinion issued Mar. 28, 2023 in International Application No. PCT/JP2021/036305.
International Preliminary Report on Patentability, with Translation of Written Opinion issued Mar. 28, 2023 in International Application No. PCT/JP2021/036306.
International Preliminary Report on Patentability, with Translation of Written Opinion issued Mar. 28, 2023 in International Application No. PCT/JP2021/036307.
International Preliminary Report on Patentability, with Translation of Written Opinion issued Mar. 28, 2023 in International Application No. PCT/JP2021/036308.
International Preliminary Report on Patentability, with Translation of Written Opinion issued Mar. 28, 2023 in International Application No. PCT/JP2021/036309.
International Preliminary Report on Patentability, with Translation of Written Opinion issued Mar. 28, 2023 in International Application No. PCT/JP2021/036310.
European Search Report issued Aug. 2, 2023 for European Patent Application No. 20 857 704.9.
International Preliminary Report on Patentability, with Translation of Written Opinion issued Aug. 29, 2023 in International Application No. PCT/JP2022/003634.
International Preliminary Report on Patentability, with Translation of Written Opinion issued Aug. 29, 2023 in International Application No. PCT/JP2022/003635.
International Preliminary Report on Patentability, with Translation of Written Opinion issued Aug. 29, 2023 in International Application No. PCT/JP2022/003636.
International Preliminary Report on Patentability, with Translation of Written Opinion issued Aug. 29, 2023 in International Application No. PCT/JP2022/003637.
International Preliminary Report on Patentability, with Translation of Written Opinion issued Aug. 29, 2023 in International Application No. PCT/JP2022/003638.
International Preliminary Report on Patentability, with Translation of Written Opinion issued Aug. 29, 2023 in International Application No. PCT/JP2022/003640.
International Preliminary Report on Patentability, with Translation of Written Opinion issued Aug. 29, 2023 in International Application No. PCT/JP2022/003641.
International Preliminary Report on Patentability, with Translation of Written Opinion issued Aug. 29, 2023 in International Application No. PCT/JP2022/003642.
International Preliminary Report on Patentability, with Translation of Written Opinion issued Aug. 29, 2023 in International Application No. PCT/JP2022/003643.
International Preliminary Report on Patentability, with Translation of Written Opinion issued Aug. 29, 2023 in International Application No. PCT/JP2022/003644.
International Preliminary Report on Patentability, with Translation of Written Opinion issued Aug. 29, 2023 in International Application No. PCT/JP2022/003645.
International Preliminary Report on Patentability, with Translation of Written Opinion issued Aug. 29, 2023 in International Application No. PCT/JP2022/003646.
International Preliminary Report on Patentability, with Translation of Written Opinion issued Aug. 29, 2023 in International Application No. PCT/JP2022/003647.
International Preliminary Report on Patentability, with Translation of Written Opinion issued Aug. 29, 2023 in International Application No. PCT/JP2022/003648.
International Preliminary Report on Patentability, with Translation of Written Opinion issued Aug. 29, 2023 in International Application No. PCT/JP2022/003649.

(56) References Cited

OTHER PUBLICATIONS

International Preliminary Report on Patentability, with Translation of Written Opinion issued Aug. 29, 2023 in International Application No. PCT/JP2022/003650.
International Preliminary Report on Patentability, with Translation of Written Opinion issued Aug. 29, 2023 in International Application No. PCT/JP2022/003651.
International Preliminary Report on Patentability, with Translation of Written Opinion issued Aug. 29, 2023 in International Application No. PCT/JP2022/003652.
International Preliminary Report on Patentability, with Translation of Written Opinion issued Aug. 29, 2023 in International Application No. PCT/JP2022/003653.
International Preliminary Report on Patentability, with Translation of Written Opinion issued Aug. 29, 2023 in International Application No. PCT/JP2022/003654.
International Preliminary Report on Patentability, with Translation of Written Opinion issued Aug. 29, 2023 in International Application No. PCT/JP2022/003657.
International Preliminary Report on Patentability, with Translation of Written Opinion issued Aug. 29, 2023 in International Application No. PCT/JP2022/003658.
International Preliminary Report on Patentability, with Translation of Written Opinion issued Aug. 29, 2023 in International Application No. PCT/JP2022/003659.
International Preliminary Report on Patentability, with Translation of Written Opinion issued Aug. 29, 2023 in International Application No. PCT/JP2022/003660.
International Preliminary Report on Patentability, with Translation of Written Opinion issued Aug. 29, 2023 in International Application No. PCT/JP2022/003661.
International Preliminary Report on Patentability, with Translation of Written Opinion issued Aug. 29, 2023 in International Application No. PCT/JP2022/003664.
International Preliminary Report on Patentability, with Translation of Written Opinion issued Aug. 29, 2023 in International Application No. PCT/JP2022/003665.
International Preliminary Report on Patentability, with Translation of Written Opinion issued Aug. 29, 2023 in International Application No. PCT/JP2022/007735.
International Preliminary Report on Patentability, with Translation of Written Opinion issued Aug. 29, 2023 in International Application No. PCT/JP2022/007737.
International Preliminary Report on Patentability, with Translation of Written Opinion issued Aug. 29, 2023 in International Application No. PCT/JP2022/007738.
Translation of the International Search Report dated Jun. 20, 2023 in International Application No. PCT/JP2023/013284.
Translation of the International Search Report dated Jun. 6, 2023 in International Application No. PCT/JP2023/013285.
Translation of the International Search Report dated Jun. 6, 2023 in International Application No. PCT/JP2023/013289.
Translation of the International Search Report dated Jun. 6, 2023 in International Application No. PCT/JP2023/013291.
Translation of the International Search Report dated Jun. 6, 2023 in International Application No. PCT/JP2023/013292.
Translation of the International Search Report dated Jun. 6, 2023 in International Application No. PCT/JP2023/013293.
Translation of the International Search Report dated Jun. 6, 2023 in International Application No. PCT/JP2023/013331.
Translation of the International Search Report dated Jun. 6, 2023 in International Application No. PCT/JP2023/013332.
Translation of the International Search Report dated Jun. 6, 2023 in International Application No. PCT/JP2023/013333.
Translation of the International Search Report dated Jun. 20, 2023 in International Application No. PCT/JP2023/013290.
European Search Report issued Oct. 20, 2023 for European Patent Application No. 20 856 953.3.
European Search Report issued Oct. 20, 2023 for European Patent Application No. 20 857 574.6.
European Search Report issued Oct. 20, 2023 for European Patent Application No. 20 857 843.5.
European Search Report issued Oct. 20, 2023 for European Patent Application No. 20 857 470.7.
European Search Report issued Feb. 10, 2025 for European Patent Application No. 22759283.9.
European Search Report issued Feb. 20, 2025 for European Patent Application No. 22759263.1.

INJECTION-MOLDED BODY AND PRODUCTION METHOD THEREFOR

CROSS-REFERENCE TO RELATED APPLICATIONS

This application is a Rule 53(b) Continuation of International Application No. PCT/JP2022/003642 filed Jan. 31, 2022, which claims priorities based on Japanese Patent Application No. 2021-031093 filed Feb. 26, 2021 and Japanese Patent Application No. 2021-162124 filed Sep. 30, 2021, the respective disclosures of which are incorporated herein by reference in their entirety.

TECHNICAL FIELD

The present disclosure relates to an injection molded article and a method for producing the same.

BACKGROUND ART

Patent Document 1 describes an ozone-resistant injection molded article comprising a perfluororesin, wherein the perfluororesin consists of a perfluoro polymer, has an MIT value of 300,000 times or more, and has unstable terminal groups of 50 or less per $1 \times 10^6$ carbon atoms in the perfluoro polymer.

RELATED ART

Patent Document

Patent Document 1: International Publication No. WO 2003/048214

SUMMARY

According to the present disclosure, there is provided an injection molded article obtained by injection molding a copolymer using a mold provided with a gate, wherein the copolymer contains tetrafluoroethylene (TFE) unit and a fluoro(alkyl vinyl ether) (FAVE) unit, a content of the fluoro(alkyl vinyl ether) unit of the copolymer is 5.2 to 6.3% by mass with respect to the whole of the monomer units, a melt flow rate at 372° C. of the copolymer is 19.0 to 35.0 g/10 min, the number of functional groups of the copolymer is 50 or less per $10^6$ main-chain carbon atoms, and the injection molded article has a gate section corresponding to the gate of the mold, and the ratio of a maximum flow length (a) from the gate section of the injection molded article to an average value (b) of a product thickness on the maximum flow length, ((a)/(b)), is 80 to 200.

Effects

According to the present disclosure, there can be provided an injection molded article which can be produced in a high productivity without causing corrosion of a mold used in molding, is excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, hardly makes fluorine ions dissolve out in a chemical solution, and has a high transparency, a beautiful appearance and a high flow length.

DESCRIPTION OF EMBODIMENTS

Figure 1:
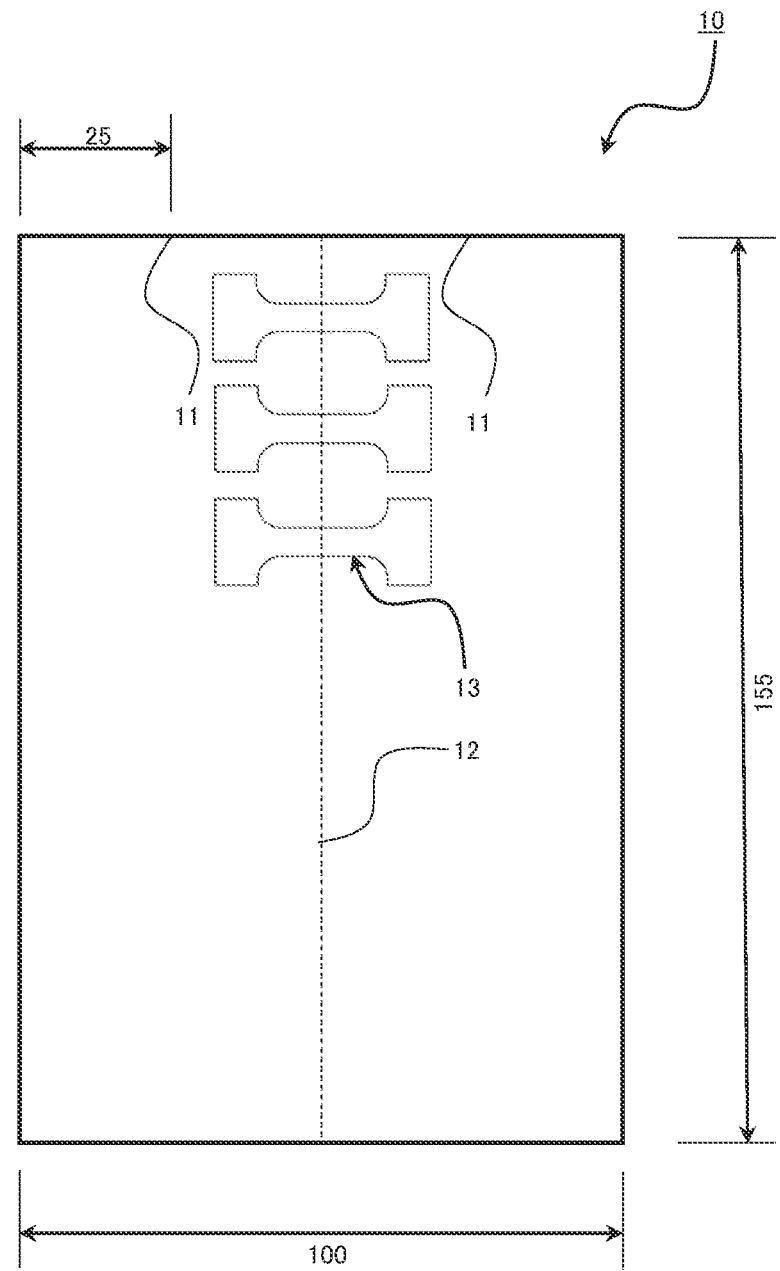
FIG. 1 is a diagram of a production method of a micro dumbbell shape test piece.

Hereinafter, specific embodiments of the present disclosure will be described in detail, but the present disclosure is not limited to the following embodiments.

Patent Document 1 proposes, in particular, as an article excellent in the ozone resistance such as a piping member or a joint used in a semiconductor production apparatus, an ozone-resistant injection molded article comprising a perfluororesin, wherein the perfluororesin consists of a perfluoro polymer, has an MIT value of 300,000 times or more, and has unstable terminal groups of 50 or less per $1 \times 10^6$ carbon atoms in the perfluoro polymer. It is also described in Examples of Patent Document 1 that a cap nut of 43 mm in minimum outer diameter, 27.02 mm in internal diameter, and 30 mm in height is produced by injection molding using an injection molding machine.

However, it is difficult to use the ozone-resistant injection molded article described in Patent Document 1 as an injection molded article having a high transparency, a beautiful appearance and a high flow length. For example, piping members that are used to transfer a chemical solution, such as joints, and flowmeter members for measuring the flow rate of a chemical solution often have a complicated shape, and they are required to have a transparency capable of checking an inside state and a beautiful appearance. They are also required to have the water vapor low permeability to avoid the contamination of the chemical solution by the moisture such as water vapor in the outside air. When a chemical solution at a high pressure or a chemical solution at a high temperature is allowed to flow, the chemical solution at a high pressure or the chemical solution at a high temperature passes through the piping member or the flowmeter member. Since the pressure of the chemical solution frequently varies, for example, at the start of the supply of fluid, at the stop of the supply of fluid, at the change of the supply pressure of fluid, not only the durability against a chemical solution at a high pressure and a high temperature, but also the durability against the variation of pressure is also required. Therefore, an injection molded article which is excellent in the water vapor low permeability, the low permeability to a chemical solution such as an electrolytic solution, the tensile creep property at high temperatures, the abrasion resistance at 150° C., the durability against repeated loads, the heat distortion resistance after chemical immersion and the high elasticity at high temperatures, and has a high transparency, a beautiful appearance and a high flow length is desired.

The injection molded article of the present disclosure is an injection molded article obtained by injection molding a specific copolymer using a mold provided with a gate, the injection molded article has a gate section corresponding to the gate of the mold, and the ratio of the maximum flow length (a) from the gate section of the injection molded article to the average value (b) of the product thickness on the maximum flow length, ((a)/(b)), is 80 to 200. The injection molded article of the present disclosure, due to having such a configuration, can be produced in a high productivity without causing corrosion of a mold used in molding, is excellent in the water vapor low permeability, the low permeability to a chemical solution such as an electrolytic solution, the tensile creep property at high temperatures, the abrasion resistance at 150° C., the durability against repeated loads, the heat distortion resistance after chemical immersion and the high elasticity at high temperatures, hardly makes fluorine ions dissolve out in a chemical solution, and has a high transparency, a beautiful appearance and a high flow length.

The injection molded article of the present disclosure has a gate section. The gate section corresponds to the gate provided in the mold used in injection molding, and is usually observed on the surface of an injection molded article as a gate mark that remains on the injection molded article after the gate and the injection molded article are separated from each other. The number of the gate section is not limited, and is preferably 1 or more, may be 4 or less, and is more preferably 1.

The injection molded article of the present disclosure has a high flow length, and the ratio of the maximum flow length (a) from the gate section of the injection molded article to the average value (b) of the product thickness on the maximum flow length, ((a)/(b)), is 80 to 200. The ratio ((a)/(b)) is preferably 85 or more, more preferably 87 or more, further still more preferably 90 or more, especially preferably 94 or more, and most preferably 100 or more, and preferably 150 or less, and more preferably 135 or less. In an injection molded article having a high ratio ((a)/(b)), forming defects such as scratches and surface delamination are likely to remain, and the smoothness is likely to deteriorate. Therefore, when an injection molded article is configured by a copolymer having a low haze value and excellent in the transparency, there is a problem in that the transparency of the injection molded article is likely to deteriorate. The injection molded article of the present disclosure is surprisingly excellent in the transparency despite having a high flow length.

The maximum flow length from (a) the gate section refers to the distance the copolymer has flowed in a mold, and can be specified by, for example, measuring the distance between the gate section and the weld section generated at the portion where the copolymer flowed in the mold joins. Alternatively, when no weld section is present between the gate section and the edge of the injection molded article which is located farthest from the gate section, the maximum flow length from the gate section (a) can be specified by measuring the distance between the gate section and the edge of the injection molded article which is located farthest from the gate section. When a plurality of distances the copolymer has flowed in a mold can be specified, for example, when an injection molded article has a plurality of gate sections, the longest distance among the specified distances is determined as the maximum flow length (a) from the gate section.

The ratio ((a)/(b)) can be determined by dividing the maximum flow length (a) determined as above by the average value (b) of the product thickness on the maximum flow length. The average value (b) of the product thickness on the maximum flow length can be calculated by measuring the minimum diameter of a cross section orthogonal to a line drawn to measure the maximum flow length (a) (the product thickness on the maximum flow length, when the cross section is a quadrangle, a short side) for every 2 mm along the line drawn to measure the maximum flow length, integrating the measured values, and calculating the average of the measured values.

The injection molded article of the present disclosure usually has a weld section corresponding to a portion where a resin has flowed in a mold and joined. The weld section can usually be observed as a weld line on the surface of the injection molded article. In the present disclosure, in addition to a large weld line that can be said as a forming defect, a hardly visible weld line is also included in the weld section.

The injection molded article of the present disclosure has a beautiful appearance and has a small maximum depth of the weld section. Thus, in the injection molded article of the present disclosure, the ratio of the maximum depth (D) of the weld section to the maximum thickness (L) of the injection molded article, (D/L), is preferably 0.8 or lower, more preferably 0.7 or lower, still more preferably 0.5 or lower, further still more preferably 0.3 or lower, and especially preferably 0.2 or lower. It can be said that as the maximum depth of the weld section is smaller, the surface of the injection molded article is smoother, and the injection molded article is more excellent in the transparency. It has also been found that as the ratio of the maximum depth (D) of the weld section to the maximum thickness (L) of the injection molded article, (D/L), is smaller, the tensile strength of the injection molded article increases significantly.

The injection molded article of the present disclosure contains a copolymer containing tetrafluoroethylene (TFE) unit and a fluoro(alkyl vinyl ether) (FAVE) unit. The copolymer is a melt-fabricable fluororesin. Being melt-fabricable means that a polymer can be melted and processed by using a conventional processing device such as an extruder or an injection molding machine.

Examples of the FAVE constituting the above FAVE unit include at least one selected from the group consisting of a monomer represented by the general formula (1):

$$CF_2=CFO(CF_2CFY^1O)_p-(CF_2CF_2CF_2O)_q-Rf \quad (1)$$

wherein $Y^1$ represents F or $CF_3$, and Rf represents a perfluoroalkyl group having 1 to 5 carbon atoms; p represents an integer of 0 to 5; and q represents an integer of 0 to 5, and a monomer represented by the general formula (2):

$$CFX=CXOCF_2OR^1 \quad (2)$$

wherein X is the same or different and represents H, F or $CF_3$; $R^1$ represents a linear or branched fluoroalkyl group having 1 to 6 carbon atoms which may contain one or two atoms of at least one selected from the group consisting of H, Cl, Br and I, or a cyclic fluoroalkyl group having 5 or 6 carbon atoms which may contain one or two atoms of at least one selected from the group consisting of H, Cl, Br and I.

Among them, the above FAVE is preferably the monomer represented by the general formula (1), more preferably at least one selected from the group consisting of perfluoro (methyl vinyl ether), perfluoro(ethyl vinyl ether) (PEVE) and perfluoro(propyl vinyl ether) (PPVE), still more preferably at least one selected from the group consisting of PEVE and PPVE, and particularly preferably PPVE.

The content of the FAVE unit of the copolymer is 5.2 to 6.3% by mass with respect to the whole of the monomer units. The content of the FAVE unit of the copolymer is preferably 5.3% by mass or higher, and more preferably 5.4% by mass or higher, and preferably 6.2% by mass or lower, more preferably 6.1% by mass or lower, and still more preferably 6.0% by mass or lower. When the content of the FAVE unit of the copolymer is too high, the tensile creep property at high temperatures, the durability against repeated loads, the water vapor low permeability and the chemical solution low permeability of the injection molded article deteriorate, and the elastic modulus of the injection molded article at high temperatures is low. When the content of the FAVE unit of the copolymer is too low, the heat distortion resistance after chemical immersion, the abrasion resistance at 150° C. and the transparency of the injection molded article deteriorate.

The content of the TFE unit of the copolymer is, with respect to the whole of the monomer units, preferably 93.7 to 94.8% by mass, more preferably 93.8% by mass or higher, and still more preferably 93.9% by mass or higher, and more preferably 94.7% by mass or lower, and still more preferably 94.6% by mass or lower. When the content of the TFE unit of the copolymer is too low, the tensile creep property at high temperatures, the durability against repeated loads, the water vapor low permeability and the chemical solution low permeability of the injection molded article may deteriorate, and the elastic modulus of the injection molded article at high temperatures may be low. When the content of the TFE unit of the copolymer is too high, the heat distortion resistance after chemical immersion, the abrasion resistance at 150° C. and the transparency of the injection molded article may deteriorate.

In the present disclosure, the content of each monomer unit in the copolymer is measured by a $^{19}F$-NMR method.

The copolymer can also contain a monomer unit originated from a monomer copolymerizable with TFE and FAVE. In this case, the content of the monomer unit copolymerizable with TFE and FAVE is, with respect to the whole of the monomer units of the copolymer, preferably 0 to 1.1% by mass, more preferably 0.05 to 0.5% by mass, and still more preferably 0.1 to 0.3% by mass.

The monomers copolymerizable with TFE and FAVE may include hexafluoropropylene (HFP), vinyl monomers represented by $CZ^1Z^2$=$CZ^3(CF_2)_nZ^4$ wherein $Z^1$, $Z^2$ and $Z^3$ are identical or different, and represent H or F; $Z^4$ represents H, F or Cl; and n represents an integer of 2 to 10, and alkyl perfluorovinyl ether derivatives represented by $CF_2$=$CF$—$OCH_2$—$Rf^1$ wherein $Rf^1$ represents a perfluoroalkyl group having 1 to 5 carbon atoms. Among these, HFP is preferred.

The copolymer is preferably at least one selected from the group consisting of a copolymer consisting only of the TFE unit and the FAVE unit, and TFE/HFP/FAVE copolymer, and is more preferably a copolymer consisting only of the TFE unit and the FAVE unit.

The melt flow rate (MFR) of the copolymer is 19.0 to 35.0 g/10 min. The MFR of the copolymer is preferably 19.5 g/10 min or higher, more preferably 20.0 g/10 min or higher, further more preferably 22.0 g/10 min or higher, especially preferably 23.0 g/10 min or higher, and most preferably 24.0 g/10 min or higher, and preferably 33.9 g/10 min or lower, more preferably 33.0 g/10 min or lower, still more preferably 32.9 g/10 min or lower, especially preferably 31.9 g/10 min or lower, and most preferably 30.9 g/10 min or lower. When the MFR of the copolymer is too low, not only the appearance of the injection molded article deteriorates and the water vapor low permeability, the transparency, the high elasticity at high temperatures, the durability against repeated loads and the chemical solution low permeability of the injection molded article are reduced, but also an injection molded article having a high flow length may not be obtained. When the MFR of the copolymer is too high, the abrasion resistance at 150° C., the transparency and the heat distortion resistance after chemical immersion deteriorate.

In the present disclosure, the MFR is a value obtained as a mass (g/10 min) of the polymer flowing out from a nozzle of 2.1 mm in inner diameter and 8 mm in length per 10 min at 372° C. under a load of 5 kg using a melt indexer, according to ASTM D1238.

The MFR can be regulated by regulating the kind and amount of a polymerization initiator to be used in polymerization of monomers, the kind and amount of a chain transfer agent, and the like.

In the present disclosure, the number of functional groups per $10^6$ main-chain carbon atoms of the copolymer is 50 or less, preferably 40 or less, more preferably 30 or less, still more preferably 20 or less, further still more preferably 15 or less, especially preferably 10 or less, and most preferably less than 6. Due to that the number of functional groups of the copolymer is within the above range, not only the tensile creep property at high temperatures and the chemical solution low permeability can be improved, but also the amount of fluorine ions dissolving out from the injection molded article into a chemical solution can be significantly reduced. Further, due to that the mold is hardly corroded even by molding the copolymer by filling the mold with the copolymer, the appearance of the injection molded article is not affected by the corrosion of the mold, and the appearance of the injection molded article to be obtained is further beautiful.

For identification of the kind of the functional groups and measurement of the number of the functional groups, infrared spectroscopy can be used.

The number of the functional groups is measured, specifically, by the following method. First, the copolymer is molded by cold press to prepare a film of 0.25 to 0.30 mm in thickness. The film is analyzed by Fourier transform infrared spectroscopy to obtain an infrared absorption spectrum of the copolymer, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the copolymer is calculated according to the following formula (A).

$$N = I \times K / t \qquad (A)$$

I: absorbance
K: correction factor
t: thickness of film (mm)

For reference, for some functional groups, the absorption frequency, the molar absorption coefficient and the correction factor are shown in Table 1. Then, the molar absorption coefficients are those determined from FT-IR measurement data of low molecular model compounds.

TABLE 1

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

Absorption frequencies of —CH$_2$CF$_2$H, —CH$_2$COF, —CH$_2$COOH, —CH$_2$COOCH$_3$ and —CH$_2$CONH$_2$ are lower by a few tens of kaysers (cm$^{-1}$) than those of —CF$_2$H, —COF, —COOH free and —COOH bonded, —COOCH$_3$ and —CONH$_2$ shown in the Table, respectively.

For example, the number of the functional group —COF is the total of the number of a functional group determined from an absorption peak having an absorption frequency of 1,883 cm$^{-1}$ derived from —CF$_2$COF and the number of a functional group determined from an absorption peak having an absorption frequency of 1,840 cm$^{-1}$ derived from —CH$_2$COF.

The functional groups are ones present on main chain terminals or side chain terminals of the copolymer, and ones present in the main chain or the side chains. The number of the functional groups may be the total of numbers of —CF=CF$_2$, —CF$_2$H, —COF, —COOH, —COOCH$_3$, —CONH$_2$ and —CH$_2$OH.

The functional groups are introduced to the copolymer by, for example, a chain transfer agent or a polymerization initiator used for production of the copolymer. For example, in the case of using an alcohol as the chain transfer agent, or a peroxide having a structure of —CH$_2$OH as the polymerization initiator, —CH$_2$OH is introduced on the main chain terminals of the copolymer. Alternatively, the functional group is introduced on the side chain terminal of the copolymer by polymerizing a monomer having the functional group.

The copolymer satisfying the above range regarding the number of functional groups can be obtained by subjecting the copolymer having such a functional group to a fluorination treatment. That is, the copolymer contained in the injection molded article of the present disclosure is preferably one which is subjected to the fluorination treatment. Further, the copolymer contained in the injection molded article of the present disclosure preferably has —CF$_3$ terminal groups.

The melting point of the copolymer is preferably 295 to 315° C., more preferably 300° C. or higher, still more preferably 301° C. or higher, and especially preferably 302° C. or higher, and more preferably 310° C. or lower, and still more preferably 305° C. or lower. Due to that the melting point is within the above range, the water vapor low permeability, the tensile creep property at high temperatures, the chemical solution low permeability, the abrasion resistance at 150° C., the durability against repeated loads, the heat distortion resistance after chemical immersion and the high elasticity at high temperatures of the injection molded article are further improved, the transparency is further high, and the appearance is further beautiful, even when the flow length of the injection molded article is high.

In the present disclosure, the melting point can be measured by using a differential scanning calorimeter [DSC].

The water vapor permeability of the injection molded article of the present disclosure is preferably 520 g/m$^2$ or lower. The injection molded article of the present disclosure has an excellent water vapor low permeability. Thus, when the injection molded article of the present disclosure is used as, for example, piping members that are used to transfer a chemical solution, such as joints, and flowmeter members for measuring the flow rate of a chemical solution, the contamination of the chemical solution by permeation of the water vapor in the outside air can be highly suppressed.

In the present disclosure, the water vapor permeability can be measured under the condition of a temperature of 95° C. and for 60 days. Specific measurement of the water vapor permeability can be carried out by a method described in Examples.

The haze value of the injection molded article of the present disclosure is preferably 7.0% or less, and more preferably 6.7% or less. Due to that the haze value of the injection molded article is within the above range, for example, when the injection molded article of the present disclosure is used as the formed article for valves, filter cages, piping, joints, bottles, flowmeters and the like, visual observation and observation by a camera or the like of the inside of the formed article are remarkably facilitated, and the determination of the flow rate and residual quantity of the content is remarkably facilitated. In the present disclosure, the haze value can be measured in accordance with JIS K 7136.

The storage elastic modulus (E') at 150° C. of the injection molded article of the present disclosure is preferably 75 MPa or higher, and more preferably 80 MPa or higher, and preferably 1,000 MPa or less, more preferably 500 MPa or less, and still more preferably 300 MPa or less. Due to that the storage elastic modulus (E') at 150° C. of the injection molded article is within the above range, the elastic modulus of the injection molded article at high temperatures is further increased, and the injection molded article is further excellent in the high elasticity at high temperatures. Therefore, the durability of the injection molded article in the case of being in contact with a chemical solution at a high pressure and at a high temperature is further improved.

The storage elastic modulus (E') can be measured by carrying out a dynamic viscoelasticity measurement under the condition of a temperature-increasing rate of 2° C./min and a frequency of 10 Hz and in the range of 30 to 250° C.

In the injection molded article of the present disclosure, the amount of fluorine ions dissolving out therefrom detected by an electrolytic solution immersion test is, in terms of mass, preferably 1.0 ppm or lower, more preferably 0.8 ppm or lower and still more preferably 0.7 ppm or lower. When the injection molded article of the present disclosure is used as, for example, piping members that are used to transfer a chemical solution, such as joints, and flowmeter members for measuring the flow rate of a chemical solution, the contamination of the chemical solution by fluorine ions can be highly suppressed.

In the present disclosure, the electrolytic solution immersion test can be carried out by preparing a test piece having a weight corresponding to that of 4 sheets of injection molded articles (15 mm×15 mm×0.5 mmt), and putting, in a thermostatic chamber of 80° C., a glass-made sample bottle in which the test piece and 2 g of dimethyl carbonate (DMC) are put and allowing the resultant to stand for 144 hours.

The injection molded article of the present disclosure may contain other components such as fillers, plasticizers, processing aids, mold release agents, pigments, flame retarders, lubricants, light stabilizers, weathering stabilizers, electrically conductive agents, antistatic agents, ultraviolet absorbents, antioxidants, foaming agents, perfumes, oils, softening agents and dehydrofluorination agents.

Examples of the fillers include silica, kaolin, clay, organo clay, talc, mica, alumina, calcium carbonate, calcium terephthalate, titanium oxide, calcium phosphate, calcium fluoride, lithium fluoride, crosslinked polystyrene, potassium titanate, carbon, boron nitride, carbon nanotube and glass fiber. The electrically conductive agents include carbon black. The plasticizers include dioctyl phthalate and pentaerythritol. The processing aids include carnauba wax, sulfone compounds, low molecular weight polyethylene and fluorine-based auxiliary agents. The dehydrofluorination agents include organic oniums and amidines.

As the above-mentioned other components, other polymers other than the copolymer may be used. The other polymers include fluororesins other than the copolymer, fluoroelastomer, and non-fluorinated polymers.

The copolymer contained in the injection molded article of the present disclosure can be produced by a polymerization method such as suspension polymerization, solution polymerization, emulsion polymerization or bulk polymerization. The polymerization method is preferably emulsion polymerization or suspension polymerization. In these polymerization methods, conditions such as temperature and pressure, and a polymerization initiator and other additives can suitably be set depending on the formulation and the amount of the copolymer.

As the polymerization initiator, an oil-soluble radical polymerization initiator, or a water-soluble radical polymerization initiator may be used.

The oil-soluble radical polymerization initiator may be a known oil-soluble peroxide, and examples thereof typically include:
  dialkyl peroxycarbonates such as di-n-propyl peroxydicarbonate, diisopropyl peroxydicarbonate, di-sec-butyl peroxydicarbonate and di-2-ethoxyethyl peroxydicarbonate;
  peroxyesters such as t-butyl peroxyisobutyrate and t-butyl peroxypivalate;
  dialkyl peroxides such as di-t-butyl peroxide; and
  di[fluoro(or fluorochloro)acyl] peroxides.

The di[fluoro(or fluorochloro)acyl] peroxides include diacyl peroxides represented by [(RfCOO)—]$_2$ wherein Rf is a perfluoroalkyl group, an ω-hydroperfluoroalkyl group or a fluorochloroalkyl group.

Examples of the di[fluoro(or fluorochloro)acyl]peroxides include di(ω-hydro-dodecafluorohexanoyl) peroxide, di(ω-hydro-tetradecafluoroheptanoyl) peroxide, di(ω-hydro-hexadecafluorononanoyl) peroxide, di(perfluoropropionyl) peroxide, di(perfluorobutyryl) peroxide, di(perfluorovaleryl) peroxide, di(perfluorohexanoyl) peroxide, di(perfluoroheptanoyl) peroxide, di(perfluorooctanoyl) peroxide, di(perfluorononanoyl) peroxide, di(ω-chloro-hexafluorobutyryl) peroxide, di(ω-chloro-decafluorohexanoyl) peroxide, di(ω-chloro-tetradecafluorooctanoyl) peroxide, ω-hydro-dodecafluoroheptanoyl-ω-hydrohexadecafluorononanoyl peroxide, ω-chloro-hexafluorobutyryl-ω-chloro-decafluorohexanoyl peroxide, ω-hydrododecafluoroheptanoyl-perfluorobutyryl peroxide, di(dichloropentafluorobutanoyl) peroxide, di(trichlorooctafluorohexanoyl) peroxide, di(tetrachloroundecafluorooctanoyl) peroxide, di(pentachlorotetradecafluorodecanoyl) peroxide and di(undecachlorotriacontafluorodocosanoyl) peroxide.

The water-soluble radical polymerization initiator may be a known water-soluble peroxide, and examples thereof include ammonium salts, potassium salts and sodium salts of persulfuric acid, perboric acid, perchloric acid, perphosphoric acid, percarbonic acid and the like, organic peroxides such as disuccinoyl peroxide and diglutaroyl peroxide, and t-butyl permaleate and t-butyl hydroperoxide. A reductant such as a sulfite salt may be combined with a peroxide and used, and the amount thereof to be used may be 0.1 to 20 times with respect to the peroxide.

In the polymerization, a surfactant, a chain transfer agent and a solvent may be used, which are conventionally known.

The surfactant may be a known surfactant, for example, nonionic surfactants, anionic surfactants and cationic surfactants may be used. Among these, fluorine-containing anionic surfactants are preferred, and more preferred are linear or branched fluorine-containing anionic surfactants having 4 to 20 carbon atoms, which may contain an ether bond oxygen (that is, an oxygen atom may be inserted between carbon atoms). The amount of the surfactant to be added (with respect to water in the polymerization) is preferably 50 to 5,000 ppm.

Examples of the chain transfer agent include hydrocarbons such as ethane, isopentane, n-hexane and cyclohexane; aromatics such as toluene and xylene; ketones such as acetone; acetate esters such as ethyl acetate and butyl acetate; alcohols such as methanol and ethanol; mercaptans such as methylmercaptan; and halogenated hydrocarbons such as carbon tetrachloride, chloroform, methylene chloride and methyl chloride. The amount of the chain transfer agent to be added may vary depending on the chain transfer constant value of the compound to be used, but is usually in the range of 0.01 to 20% by mass with respect to the solvent in the polymerization.

The solvent may include water and mixed solvents of water and an alcohol.

In the suspension polymerization, in addition to water, a fluorosolvent may be used. The fluorosolvent may include hydrochlorofluoroalkanes such as $CH_3CClF_2$, $CH_3CCl_2F$, $CF_3CF_2CCl_2H$ and $CF_2ClCF_2CFHCl$; chlorofluoroalaknes such as $CF_2ClCFClCF_2CF_3$ and $CF_3CFClCFClCF_3$; hydrofluroalkanes such as $CF_3CFHCFHCF_2CF_2CF_3$, $CF_2HCF_2CF_2CF_2H$ and $CF_3CF_2CF_2CF_2CF_2CF_2H$; hydrofluoroethers such as $CH_3OC_2F_5$, $CH_3OC_3F_5CF_3CF_2CH_2OCHF_2$, $CF_3CHFCF_2OCH_3$, $CHF_2CF_2OCH_2F$, $(CF_3)_2CHCF_2OCH_3$, $CF_3CF_2CH_2OCH_2CHF_2$ and $CF_3CHFCF_2OCH_2CF_3$; and perfluoroalkanes such as perfluorocyclobutane, $CF_3CF_2CF_2CF_3$, $CF_3CF_2CF_2CF_2CF_3$ and $CF_3CF_2CF_2CF_2CF_2CF_3$, and among these, perfluoroalkanes are preferred. The amount of the fluorosolvent to be used is, from the viewpoint of the suspensibility and the economic efficiency, preferably 10 to 100% by mass with respect to an aqueous medium.

The polymerization temperature is not limited, and may be 0 to 100° C. The polymerization pressure is suitably set depending on other polymerization conditions to be used such as the kind, the amount and the vapor pressure of the solvent, and the polymerization temperature, but may usually be 0 to 9.8 MPaG.

In the case of obtaining an aqueous dispersion containing the copolymer by the polymerization reaction, the copolymer can be recovered by coagulating, cleaning and drying the copolymer contained in the aqueous dispersion. Then in the case of obtaining the copolymer as a slurry by the polymerization reaction, the copolymer can be recovered by taking out the slurry from a reaction container, and cleaning and drying the slurry. The copolymer can be recovered in a shape of powder by the drying.

The copolymer obtained by the polymerization may be formed into pellets. A method of forming into pellets is not limited, and a conventionally known method can be used. Examples thereof include methods of melt extruding the copolymer by using a single-screw extruder, a twin-screw extruder or a tandem extruder and cutting the resultant into a predetermined length to form the copolymer into pellets. The extrusion temperature in the melt extrusion needs to be varied depending on the melt viscosity and the production method of the copolymer, and is preferably the melting point of the copolymer+20° C. to the melting point of the copolymer+140° C. A method of cutting the copolymer is not limited, and there can be adopted a conventionally known method such as a strand cut method, a hot cut method, an underwater cut method, or a sheet cut method. Volatile components in the obtained pellets may be removed by heating the pellets (degassing treatment). Alternatively, the obtained pellets may be treated by bringing the pellets into contact with hot water of 30 to 200° C., steam of 100 to 200° C. or hot air of 40 to 200° C.

Alternatively, the copolymer obtained by the polymerization may be subjected to fluorination treatment. The fluorination treatment can be carried out by bringing the copolymer having been subjected to no fluorination treatment into contact with a fluorine-containing compound. By the fluorination treatment, thermally unstable functional groups of the copolymer, such as —COOH, —COOCH$_3$, —CH$_2$OH, —COF, —CF=CF$_2$ and —CONH$_2$, and thermally relatively stable functional groups thereof, such as —CF$_2$H, can be converted to thermally very stable —CF$_3$. Consequently, the total number (number of functional groups) of —COOH, —COOCH$_3$, —CH$_2$OH, —COF, —CF=CF$_2$, —CONH$_2$ and —CF$_2$H of the copolymer can easily be controlled in the above-mentioned range.

The fluorine-containing compound is not limited, but includes fluorine radical sources generating fluorine radicals under the fluorination treatment condition. The fluorine radical sources include F$_2$ gas, CoF$_3$, AgF$_2$, UF$_6$, OF$_2$, N$_2$F$_2$, CF$_3$OF, halogen fluorides (for example, IF$_5$ and ClF$_3$).

The fluorine radical source such as F$_2$ gas may be, for example, one having a concentration of 100%, but from the viewpoint of safety, the fluorine radical source is preferably mixed with an inert gas and diluted therewith to 5 to 50% by mass, and then used; and it is more preferably to be diluted to 15 to 30% by mass. The inert gas includes nitrogen gas, helium gas and argon gas, but from the viewpoint of the economic efficiency, nitrogen gas is preferred.

The condition of the fluorination treatment is not limited, and the copolymer in a melted state may be brought into contact with the fluorine-containing compound, but the fluorination treatment can be carried out usually at a temperature of not higher than the melting point of the copolymer, preferably at 20 to 240° C. and more preferably at 100 to 220° C. The fluorination treatment is carried out usually for 1 to 30 hours and preferably 5 to 25 hours. The fluorination treatment is preferred which brings the copolymer having been subjected to no fluorination treatment into contact with fluorine gas (F$_2$ gas).

The injection molded article of the present disclosure can be produced by the method for injection molding the copolymer obtained as above using an injection molding machine and a mold provided with a gate. According to the production method of the present disclosure, an injection molded article can be produced in a high productivity without causing corrosion of a mold used in molding, and there can be produced an injection molded article which is excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, hardly makes fluorine ions dissolve out in a chemical solution, and has a high transparency, a beautiful appearance and a high flow length. Further, since the production method of the present disclosure comprises forming the above copolymer, an injection molded article having a high flow length and a complicated shape can easily be produced by using the production method of the present disclosure, and for example, injection molded articles such as housings of flowmeters, housings of valves, and filter cages can easily be produced.

The shape of the copolymer to be supplied into an injection molding machine is not limited, and a copolymer in a shape of powder, pellet, or the like can be used.

A known injection molding machine can be used. The copolymer injected from a nozzle of an injection molding machine usually passes through a sprue, a runner, and a gate, flows into a mold cavity, and is filled in the mold cavity. In the mold used for injection molding, a runner and a gate are formed, and a mold cavity for forming an injection molded article is formed.

The shape of the sprue is not limited, and may be a circle, a rectangle, a trapezoid, or the like. The shape of the runner is not limited, and may be a circle, a rectangle, a trapezoid, or the like. The runner type is not limited, and may be a cold runner or a hot runner. The gate type is not limited, and may be a direct gate, a side gate, a submarine gate, or the like. The number of gates to the mold cavity is not limited. Any of the mold having a single-gate structure and the mold having a multi-gate structure may be used. The number of mold cavities of the mold (number of cavities) is preferably 1 to 64.

Regarding the flow length of the copolymer from the gate, a mold having a ratio of the maximum flow length (c) from the gate of the mold to the average value (d) of the cavity thickness of the mold on the maximum flow length, ((c)/(d)), of 80 to 200 is used in the injection molding. The ratio ((c)/(d)) is preferably 85 or more, more preferably 87 or more, still more preferably 90 or more, especially preferably 94 or more, and most preferably 100 or more, and preferably 150 or less, and more preferably 135 or less.

There are tendencies that, as the cavity of the mold to be used in the injection molding has more parts having a small thickness, that is, as the ratio ((c)/(d)) is higher, the flow length of the copolymer is unlikely to be longer, so that it is more difficult to obtain a large injection molded article having a lot of thin-wall parts (that is, an injection molded article having a high ratio ((a)/(b))), and furthermore, the appearance of the injection molded article to be obtained deteriorates and the transparency thereof also deteriorates. On the other hand, in the conventional injection molded article having a high ratio ((a)/(b)), there is room for improvement in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, even if the appearance is excellent. Further, an injection molded article which hardly makes fluorine ions dissolve out in a chemical solution is also desired. The production method of the present disclosure, due to having the above configuration, can produce an injection molded article which has a ratio ((a)/(b)) within the range as described above, and furthermore, is excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, hardly makes fluorine ions dissolve out in a chemical solution, and has a high transparency and a beautiful appearance.

In the production method of the present disclosure, due to that there can be produced an injection molded article which can further suppress the corrosion of the mold, is further excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, and has a further high transparency and a further beautiful appearance, the temperature of the mold is preferably 150 to 250° C., and more preferably 170° C. or higher, and more preferably 230° C. or lower, and still more preferably 200° C. or lower.

In the production method of the present disclosure, due to that there can be produced an injection molded article which is further excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, and has a further high transparency and a further beautiful appearance, the temperature of the cylinder provided in an injection molding machine is preferably 350 to 420° C., and more preferably 370° C. or higher, and more preferably 400° C. or lower.

The injection molded article of the present disclosure can be used in various applications. The injection molded article of the present disclosure may be, for example, nuts, bolts, joints, films, bottles, gaskets, tubes, hoses, pipes, valves, sheets, seals, packings, tanks, rollers, containers, cocks, connectors, filter housings, filter cages, flowmeters, pumps, wafer carrier, or wafer boxes.

Due to that the injection molded article of the present disclosure can be produced in a high productivity without causing corrosion of a mold used in molding, is excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, hardly makes fluorine ions dissolve out in a chemical solution, and has a high transparency, a beautiful appearance and a high flow length, it can suitably be utilized for nuts, bolts, joints, packings, valves, cocks, connectors, filter housings, filter cages, flowmeters, pumps, and the like. For example, the injection molded article of the present disclosure can suitably be utilized as piping members (in particular, housings of valves and filter cages) to be used in the transfer of chemical solutions, and flowmeter housings provided with flow paths for chemical solutions in flowmeters. The piping member and flowmeter housing of the present disclosure are excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, and have a high transparency and a beautiful appearance. Hence, the piping member and flowmeter housing of the present disclosure are excellent in the viewability of the inside, and in particular, the flowmeter housing, enables the float in the inside to be easily visually observed and observed by a camera or the like, can be preferably used also in the measurement of the flow rate of a chemical solution at about 150° C., and are hardly damaged even when stresses are repeatedly applied according to the start of the flow, the stop of the flow, and the change of the flow rate of the chemical solution. Further, the piping member and flowmeter housing of the present disclosure can be produced at a significantly high injection speed without causing corrosion of a mold used in molding even in the case of having a thin-wall part, and have a beautiful appearance.

Due to that the injection molded article of the present disclosure can be produced in a high productivity without causing corrosion of a mold used in molding, is excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, hardly makes fluorine ions dissolve out in a chemical solution, and has a high transparency, a beautiful appearance and a high flow length, it can suitably be utilized as members to be compressed such as gaskets and packings.

Due to that the injection molded article of the present disclosure can be produced in a high productivity without causing corrosion of a mold used in molding, is excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, hardly makes fluorine ions dissolve out in a chemical solution, and has a high transparency, a beautiful appearance and a high flow length, it can suitably be utilized as bottles or tubes. The bottles or tubes of the present disclosure enable the content to be easily visually recognized and are hardly damaged during use.

The injection molded article of the present disclosure can be produced in a high productivity without causing corrosion of a mold used in molding, is excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures, hardly makes fluorine ions dissolve out in a chemical solution, and has a high transparency, a beautiful appearance and a high flow length. Therefore, the injection molded article of the present disclosure can suitably be utilized for housings of valves and valves. The valves of the present disclosure can be produced at a low cost and in a significantly high productivity without causing corrosion of a mold, and are hardly damaged even when opening and closing are repeated with a high frequency, and are excellent in the water vapor low permeability, the tensile creep property at high temperatures, the chemical solution low permeability, the abrasion resistance at 150° C., the durability against repeated loads, the heat distortion resistance after chemical immersion and the high elasticity at high temperatures. The valves of the present disclosure, due to having a high elastic modulus even at high temperatures, can be preferably used to control fluid, for example, at 100° C. or higher, in particular, at about 150° C.

Although the embodiments have been described above, it will be understood that various changes in form and details are possible without departing from the gist and scope of the claims.

According to the present disclosure, there is provided an injection molded article obtained by injection molding a copolymer using a mold provided with a gate, wherein the copolymer contains tetrafluoroethylene (TFE) unit and a fluoro(alkyl vinyl ether) (FAVE) unit, a content of the fluoro(alkyl vinyl ether) unit of the copolymer is 5.2 to 6.3% by mass with respect to the whole of the monomer units, a melt flow rate at 372° C. of the copolymer is 19.0 to 35.0 g/10 min, the number of functional groups of the copolymer is 50 or less per $10^6$ main-chain carbon atoms, and the injection molded article has a gate section corresponding to the gate of the mold, and the ratio of a maximum flow length (a) from the gate section of the injection molded article to an average value (b) of a product thickness on the maximum flow length, ((a)/(b)), is 80 to 200.

In the injection molded article of the present disclosure, the fluoro(alkyl vinyl ether) unit of the copolymer is preferably perfluoro(propyl vinyl ether) unit.

In the injection molded article of the present disclosure, the content of the fluoro(alkyl vinyl ether) unit of the copolymer is preferably 5.4 to 6.1% by mass with respect to the whole of the monomer units.

In the injection molded article of the present disclosure, the melt flow rate at 372° C. of the copolymer is preferably 20.0 to 30.9 g/10 min.

In the injection molded article of the present disclosure, the melting point of the copolymer is preferably 295 to 305° C. It is preferable that the injection molded article of the present disclosure further has a weld section, and the ratio of a maximum depth (D) of the weld section to a maximum thickness (L) of the injection molded article, (D/L), is 0.8 or less.

According to the present disclosure, there is provided a method for producing the above injection molded article, the method comprising: injection molding the copolymer by using an injection molding machine and the mold provided with the gate, wherein the ratio of a maximum flow length (c) from the gate of the mold to an average value (d) of a cavity thickness of the mold on the maximum flow length, ((c)/(d)), is 80 to 200.

In the production method of the present disclosure, the temperature of the mold is preferably 150 to 250° C.

In the production method of the present disclosure, the cylinder temperature of the injection molding machine is preferably 350 to 420° C.

EXAMPLES

Next, embodiments of the present disclosure will be described with reference to examples, but the present disclosure is not intended to be limited by these examples.

The numerical values of the Examples were measured by the following methods.

(Content of a Monomer Unit)

The content of each monomer unit was measured by an NMR analyzer (for example, manufactured by Bruker BioSpin GmbH, AVANCE 300, high-temperature probe).

(Melt Flow Rate (MFR))

The polymer was made to flow out from a nozzle of 2.1 mm in inner diameter and 8 mm in length at 372° C. under a load of 5 kg by using a Melt Indexer G-01 (manufactured by Toyo Seiki Seisaku-sho, Ltd.) according to ASTM D1238, and the mass (g/10 min) of the polymer flowing out per 10 min was determined.

(Melting Point)

The polymer was heated, as a first temperature raising step at a temperature-increasing rate of 10° C./min from 200° C. to 350° C., then cooled at a cooling rate of 10° C./min from 350° C. to 200° C., and then again heated, as second temperature raising step, at a temperature-increasing rate of 10° C./min from 200° C. to 350° C. by using a differential scanning calorimeter (trade name: X-DSC7000, manufactured by Hitachi High-Tech Science Corp.); and the melting point was determined from a melting curve peak observed in the second temperature raising step.

(Number of Functional Groups)

Pellets of the copolymer were molded by cold press into a film of 0.25 to 0.30 mm in thickness. The film was 40 times scanned and analyzed by a Fourier transform infrared spectrometer [FT-IR (Spectrum One, manufactured by PerkinElmer, Inc.)] to obtain an infrared absorption spectrum, and a difference spectrum against a base spectrum that is completely fluorinated and has no functional groups is obtained. From an absorption peak of a specific functional group observed on this difference spectrum, the number N of the functional group per $1 \times 10^6$ carbon atoms in the sample was calculated according to the following formula (A).

$$N = I \times K / t \quad (A)$$

I: absorbance
K: correction factor
t: thickness of film (mm)

Regarding the functional groups in the present disclosure, for reference, the absorption frequency, the molar absorption coefficient and the correction factor are shown in Table 2. The molar absorption coefficients are those determined from FT-IR measurement data of low molecular model compounds.

[Table 2]

TABLE 2

| Functional Group | Absorption Frequency (cm$^{-1}$) | Molar Extinction Coefficient (l/cm/mol) | Correction Factor | Model Compound |
|---|---|---|---|---|
| —COF | 1883 | 600 | 388 | $C_7F_{15}COF$ |
| —COOH free | 1815 | 530 | 439 | $H(CF_2)_6COOH$ |
| —COOH bonded | 1779 | 530 | 439 | $H(CF_2)_6COOH$ |
| —COOCH$_3$ | 1795 | 680 | 342 | $C_7F_{15}COOCH_3$ |
| —CONH$_2$ | 3436 | 506 | 460 | $C_7H_{15}CONH_2$ |
| —CH$_2$OH$_2$, —OH | 3648 | 104 | 2236 | $C_7H_{15}CH_2OH$ |
| —CF$_2$H | 3020 | 8.8 | 26485 | $H(CF_2CF_2)_3CH_2OH$ |
| —CF=CF$_2$ | 1795 | 635 | 366 | $CF_2$=$CF_2$ |

Synthesis Example 1

49 L of pure water was charged in a 174 L-volume autoclave; nitrogen replacement was sufficiently carried out; thereafter, 40.7 kg of perfluorocyclobutane, 1.90 kg of perfluoro(propyl vinyl ether) (PPVE) and 3.20 kg of methanol were charged; and the temperature in the system was held at 35° C. and the stirring speed was held at 200 rpm. Then, tetrafluoroethylene (TFE) was introduced under pressure up to 0.64 MPa, and thereafter 0.041 kg of a 50% methanol solution of di-n-propyl peroxydicarbonate was charged to initiate polymerization. Since the pressure in the system decreased along with the progress of the polymerization, TFE was continuously supplied to make the pressure constant, and 0.057 kg of PPVE was added for every 1 kg of TFE supplied and the polymerization was continued for 19 hours. TFE was released to return the pressure in the autoclave to the atmospheric pressure, and thereafter, an obtained reaction product was washed with water and dried to thereby obtain 30 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the PPVE content was measured by the above-mentioned method. The results are shown in Table 3.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and the $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. By using the fluorinated pellets, the above physical properties were measured by the methods described above. The results are shown in Table 3.

Synthesis Example 2

Fluorinated pellets were obtained as in Synthesis Example 1, except for changing the charged amount of PPVE to 2.01 kg, changing the charged amount of methanol to 3.15 kg, and changing the additionally charged amount of PPVE for every 1 kg of TFE supplied to 0.059 kg. The results are shown in Table 3.

Synthesis Example 3

Fluorinated pellets were obtained as in Synthesis Example 1, except for changing the charged amount of PPVE to 2.10 kg, changing the charged amount of methanol to 4.10 kg, changing the additionally charged amount of PPVE for every 1 kg of TFE supplied to 0.062 kg, and changing the polymerization time to 20 hours. The results are shown in Table 3.

Synthesis Example 4

Fluorinated pellets were obtained as in Synthesis Example 1, except for changing the charged amount of PPVE to 2.24 kg, changing the charged amount of methanol to 3.70 kg, changing the additionally charged amount of PPVE for every 1 kg of TFE supplied to 0.064 kg, and changing the polymerization time to 19.5 hours. The results are shown in Table 3.

Synthesis Example 5

Fluorinated pellets were obtained as in Synthesis Example 1, except for changing the charged amount of PPVE to 2.29 kg, changing the charged amount of methanol to 3.30 kg, changing the additionally charged amount of PPVE for every 1 kg of TFE supplied to 0.065 kg, changing the raised temperature of the vacuum vibration-type reactor to 170° C., and changing the reaction condition to at 170° C. and for 5 hours. The results are shown in Table 3.

Synthesis Example 6

Fluorinated pellets were obtained as in Synthesis Example 1, except for changing the charged amount of methanol to 2.53 kg, and changing the polymerization time to 18.5 hours. The results are shown in Table 3.

Synthesis Example 7

Fluorinated pellets were obtained as in Synthesis Example 1, except for changing the charged amount of pure water to 34.0 L, perfluorocyclobutane to 30.4 kg, PPVE to 1.14 kg and methanol to 3.10 kg, introducing TFE under pressure up to 0.60 MPa, charging 0.060 kg of the 50% methanol solution of di-n-propyl peroxydicarbonate, changing the additionally charged amount of PPVE for every 1 kg of TFE supplied to 0.058 kg, and changing the polymerization time to 24.5 hours. The results are shown in Table 3.

Synthesis Example 8

Fluorinated pellets were obtained as in Synthesis Example 1, except for changing the charged amount of pure water to 34.0 L, perfluorocyclobutane to 30.4 kg, PPVE to 0.98 kg and methanol to 1.30 kg, introducing TFE under pressure up to 0.60 MPa, charging 0.060 kg of the 50% methanol solution of di-n-propyl peroxydicarbonate, changing the additionally charged amount of PPVE for every 1 kg of TFE supplied to 0.052 kg, and changing the polymerization time to 23 hours. The results are shown in Table 3.

Synthesis Example 9

Non-fluorinated pellets were obtained as in Synthesis Example 1, except for changing the charged amount of PPVE to 2.24 kg, changing the charged amount of methanol to 4.02 kg, changing the additionally charged amount of PPVE for every 1 kg of TFE supplied to 0.064 kg, and changing the polymerization time to 20 hours. The results are shown in Table 3.

Synthesis Example 10

51.8 L of pure water was charged in a 174 L-volume autoclave; nitrogen replacement was sufficiently carried out; thereafter, 40.9 kg of perfluorocyclobutane, 3.01 kg of perfluoro(propyl vinyl ether) (PPVE) and 1.78 kg of methanol were charged; and the temperature in the system was held at 35° C. and the stirring speed was held at 200 rpm. Then, tetrafluoroethylene (TFE) was introduced under pressure up to 0.64 MPa, and thereafter 0.051 kg of a 50% methanol solution of di-n-propyl peroxydicarbonate was charged to initiate polymerization. Since the pressure in the system decreased along with the progress of the polymerization, TFE was continuously supplied to make the pressure constant, and 0.063 kg of PPVE was additionally charged for every 1 kg of TFE supplied. The polymerization was finished at the time when the amount of TFE additionally charged reached 40.9 kg. Unreacted TFE was released to return the pressure in the autoclave to the atmospheric pressure, and thereafter, an obtained reaction product was washed with water and dried to thereby obtain 43.5 kg of a powder.

The obtained powder was melt extruded at 360° C. by a screw extruder (trade name: PCM46, manufactured by Ikegai Corp.) to thereby obtain pellets of a TFE/PPVE copolymer. By using the obtained pellets, the PPVE content was measured by the above-mentioned method.

The obtained pellets were put in a vacuum vibration-type reactor VVD-30 (manufactured by Okawara MFG. Co., Ltd.), and heated to 210° C. After vacuumizing, $F_2$ gas diluted to 20% by volume with $N_2$ gas was introduced to the atmospheric pressure. 0.5 hour after the $F_2$ gas introduction, vacuumizing was once carried out and the $F_2$ gas was again introduced. Further, 0.5 hour thereafter, vacuumizing was again carried out and $F_2$ gas was again introduced. Thereafter, while the above operation of the $F_2$ gas introduction and the vacuumizing was carried out once every 1 hour, the reaction was carried out at a temperature of 210° C. for 10 hours. After the reaction was finished, the reactor interior was replaced sufficiently by $N_2$ gas to finish the fluorination reaction. The results are shown in Table 3.

Synthesis Example 11

Fluorinated pellets were obtained as in Synthesis Example 1, except for changing the charged amount of PPVE to 2.81 kg, changing the charged amount of methanol to 2.83 kg, changing the additionally charged amount of PPVE for every 1 kg of TFE supplied to 0.075 kg, and changing the polymerization time to 19.5 hours. The results are shown in Table 3.

TABLE 3

| | PPVE content (% by mass) | MFR (g/10 min) | Number of functional groups (number/$C10^6$) | Melting point (° C.) |
|---|---|---|---|---|
| Synthesis Example 1 | 5.4 | 24.0 | <6 | 302 |
| Synthesis Example 2 | 5.6 | 25.0 | <6 | 302 |
| Synthesis Example 3 | 5.8 | 30.9 | <6 | 302 |
| Synthesis Example 4 | 6.0 | 29.0 | <6 | 302 |
| Synthesis Example 5 | 6.1 | 25.0 | 28 | 302 |
| Synthesis Example 6 | 5.4 | 20.0 | <6 | 302 |
| Synthesis Example 7 | 5.5 | 61.0 | <6 | 302 |
| Synthesis Example 8 | 4.9 | 30.4 | <6 | 302 |
| Synthesis Example 9 | 6.0 | 28.8 | 298 | 302 |
| Synthesis Example 10 | 5.9 | 15.0 | <6 | 302 |
| Synthesis Example 11 | 7.0 | 24.0 | <6 | 296 |

The description of "<6" in Table 3 means that the number of functional groups is less than 6.

Experimental Examples 1 to 6 and Comparative Experimental Examples 1 to 5

By using the pellets obtained above, sheet-shape injection molded articles each having different shapes were prepared by the following method. The obtained sheet-shape injection molded articles were evaluated. The results are shown in Table 4.

Sheet-shape injection molded article (40 mm×40 mm×0.5 mmt)

The copolymer was injection molded by using an injection molding machine (SE50EV-A, manufactured by Sumitomo Heavy Industries, Ltd.) set at a cylinder temperature of 400° C., a mold temperature of 200° C. and an injection speed of 20 mm/s. The mold used was a mold (4 cavities of 40 mm×40 mm×0.5 mmt, side gate) made of HPM38.

Sheet-shape injection molded article (45 mm×45 mm×0.6 mmt)

The copolymer was injection molded by using an injection molding machine (SE50EV-A, manufactured by Sumitomo Heavy Industries, Ltd.) set at a cylinder temperature of 400° C., a mold temperature of 230° C. and an injection speed of 20 mm/s. The mold used was a mold (4 cavities of 45 mm×45 mm×0.6 mmt, side gate) made of HPM38.

Sheet-shape injection molded article (155 mm×100 mm×2 mmt)

The copolymer was injection molded by using an injection molding machine (SE50EV-A, manufactured by Sumitomo Heavy Industries, Ltd.) set at a cylinder temperature of 380° C., a mold temperature of 180° C. and an injection speed of 10 mm/s. The mold used was a mold (155 mm×100 mm×2 mmt, film gate) Cr plated on HPM38.

Sheet-shape injection molded article (180 mm×60 mm×2.4 mmt)

The copolymer was injection molded by using an injection molding machine (SE50EV-A, manufactured by Sumitomo Heavy Industries, Ltd.) set at a cylinder temperature of 380° C., a mold temperature of 180° C. and an injection speed of 10 mm/s. The mold used was a mold (180 mm×60 mm×2.4 mmt, film gate) Cr plated on HPM38.

(Water Vapor Permeability)

The sheet-shape injection molded article (40 mm×40 mm×0.5 mmt) was allowed to stand at 60° C. for 24 hours, and a sheet-shape test piece was prepared from the injection molded article. 10 g of water was put in a test cup (permeation area: 7.065 $cm^2$), and the test cup was covered with the sheet-shape injection molded article; and a PTFE gasket was pinched and fastened to hermetically close the test cup. The sheet-shape test piece was brought into contact with water, and held at a temperature of 95° C. for 60 days, and thereafter, the test cup was taken out and allowed to stand at room temperature for 2 hours; thereafter, the amount of the mass lost was measured. The water vapor permeability (g/$m^2$) was determined by the following formula.

Water vapor permeability (g/$m^2$)=amount of mass lost (g)/permeation area ($m^2$)

(Haze Value)

After the sheet-shape injection molded article (45 mm×45 mm×0.6 mmt) was allowed to stand at 60° C. for 24 hours, the sheet was dipped in a quartz cell in which pure water was put by using a haze meter (trade name: NDH7000SP, manufactured by NIPPON DENSHOKU INDUSTRIES Co., Ltd.) according to JIS K 7136, and the haze value was measured.

(Storage Elastic Modulus (E'))

The storage elastic modulus was determined by carrying out a dynamic viscoelasticity measurement using a DVA-220 (manufactured by IT Keisoku Seigyo K. K.). After the sheet-shape injection molded article (40 mm×40 mm×0.5 mmt) was allowed to stand at 60° C. for 24 hours, a test piece of 25 mm in length and 5 mm in width was cut out, the measurement was carried out under the condition of a temperature-increasing rate of 2° C./min, and a frequency of 10 Hz and in the range of 30° C. to 250° C., and the storage elastic modulus (MPa) at 150° C. was identified.

(Tensile Creep Test)

The tensile creep strain was measured by using TMA-7100 manufactured by Hitachi High-Tech Science Corporation. The sheet-shape injection molded article (40 mm×40 mm×0.5 mmt) was punched to prepare a sample of 2 mm in width and 22 mm in length. The sample was mounted on measurement jigs with a 10 mm distance between jigs. A load was applied to the sample such that the load on the cross-section was 2.41 N/$mm^2$, the sample was allowed to stand at 240° C., and the displacement (mm) of the length of the sample from the time point 70 min after the start of the test until the time point 300 min after the start of the test was measured to thereby calculate the proportion (tensile creep strain (%)) of the displacement of the length (mm) to the length of the initial sample length (10 mm). A sheet having a small tensile creep strain (%) measured under the condition of 240° C. and 300 min hardly elongates even when a tensile load is applied in a remarkably high temperature environment and is excellent in the high temperature tensile creep properties.

(Electrolytic Solution Immersion Test)

From the sheet-shape injection molded article (40 mm×40 mm×0.5 mmt), test pieces of 15-mm square were cut out. Four sheets of the obtained test pieces and 2 g of dimethyl carbonate (DMC) were put in a 20-mL glass sample bottle, and the cap of the sample bottle was closed. The sample bottle was put in a thermostatic chamber at 80° C., and allowed to stand for 240 hours to thereby immerse the test pieces in the DMC. Thereafter, the sample bottle was taken out from the thermostatic chamber, and cooled to room temperature; then, the test pieces were taken out from the sample bottle. The DMC remaining after the test pieces were taken out and allowed to be air-dried in the sample bottle put in a room controlled to be a temperature of 25° C. for 24 hours; and 2 g of ultrapure water was added. The obtained aqueous solution was transferred to a measuring cell of an ion chromatograph system; and the amount of fluorine ions in the aqueous solution was measured by an ion chromatograph system (manufactured by Thermo Fisher Scientific Inc., Dionex ICS-2100)

(Chemical Immersion Crack Test (Heat Distortion Resistance after Chemical Immersion))

The sheet-shape injection molded article (155 mm×100 mm×2 mmt) was punched out by using a rectangular dumbbell of 13.5 mm×38 mm to obtain 3 test pieces. A notch was formed on the middle of a long side of the each obtained test piece according to ASTM D1693 by a blade of 19 mm×0.45 mm. Three notched test pieces and 25 g of 85% aqueous phosphoric acid solution were put in a 100-mL container, and heated in an electric furnace at 120° C. for 100 hours; and thereafter, the notched test pieces were taken out. Then, the three notched test pieces obtained were mounted on a stress crack test jig according to ASTM D1693, and heated in an electric furnace at 150° C. for 24 hours; thereafter, the notches and their vicinities were visually observed and the number of cracks was counted. A sheet having no crack generated is excellent in the heat distortion resistance even after immersion in a chemical solution.

Good: the number of cracks was 0

Poor: the number of cracks was 1 or more (Electrolytic Solution Permeability)

The sheet-shape injection molded article (40 mm×40 mm×0.5 mmt) was allowed to stand at 60° C. for 24 hours, and a sheet-shape test piece was prepared from the injection molded article. 5.5 g of dimethyl carbonate (DMC) was put in a test cup (permeation area: 7.065 cm$^2$), and the test cup was covered with the sheet-shape test piece; and a PTFE gasket was pinched and fastened to hermetically close the test cup. The sheet-shape test piece was brought into contact with the DMC, and held at a temperature of 60° C. for 60 days, and thereafter, the test cup was taken out and allowed to stand at room temperature for 1 hour; thereafter, the amount of the mass lost was measured. The electrolytic solution permeability (g/m$^2$) was determined by the following formula.

Electrolytic solution permeability (g/m$^2$)=amount of mass lost (g)/permeation area (m$^2$)

(Abrasion Test)

From the sheet-shape injection molded article (155 mm×100 mm×2 mmt), a test piece of 10 cm×10 cm was cut out. The prepared test piece was fixed on a test bench of a Taber abrasion tester (No. 101 Taber type abrasion tester with an option, manufactured by YASUDA SEIKI SEISAKUSHO, LTD.) and the abrasion test was carried out at a test piece surface temperature of 150° C. and a load of 500 g, using an abrasion wheel CS-10 (rotationally polished in 20 rotations with an abrasive paper #240) and at a rotation rate of 60 rpm by using the Taber abrasion tester. The weight of the test piece after 1,000 rotations was measured, and the same test piece was further subjected to the test of 8,000 rotations and thereafter, the weight thereof was measured. The abrasion loss was determined by the following formula.

Abrasion loss (mg)=$M1-M2$

M1: the weight of the test piece after the 1,000 rotations (mg)

M2: the weight of the test piece after the 8,000 rotations (mg)

(Tensile Strength after 100,000 Cycles)

The tensile strength after 100,000 cycles was measured by using a fatigue testing machine MMT-250NV-10 manufactured by Shimadzu Corporation. By using the sheet-shape injection molded article (180 mm×60 mm×2.4 mmt) and an ASTM D1708 micro dumbbell, a dumbbell-shape sample (thickness: 2.4 mm, width: 5.0 mm, measurement section length: 22 mm) was prepared. The sample was mounted on a measurement jig, and the measurement jig was installed in a constant-temperature vessel at 150° C. in a state where the sample was mounted. The tension in the uniaxial direction was repeated at a stroke of 0.2 mm and a frequency of 100 Hz, and the tensile strength for each tension (the tensile strength when the stroke was +0.2 mm) was measured. The tensile strength after 100,000 cycles was calculated from the measured value according to the following formula. In the present Example, the cross-sectional area of the sample was 12.0 m$^2$.

Tensile strength after 100,000 cycles (mN/mm$^2$)=tensile strength (100,000 times) (mN)/cross-sectional area of sample (mm$^2$)

The tensile strength after 100,000 cycles is the ratio of the tensile strength when repeated loads are applied 100,000 times to the cross-sectional area of the sample. A sheet having a high tensile strength after 100,000 cycles retains a high tensile strength even after loads are applied 100,000 times, and is excellent in the durability to repeated loads.

(Mold Corrosion Test)

20 g of the pellets was put in a glass container (50-ml screw vial); and a metal post (5-mm square shape, length of 30 mm) formed of HPM38 (Cr-plated) or HPM38 (Ni-plated) was hung in the glass container so as not to be in contact with the pellets. Then, the glass container was covered with a lid made of an aluminum foil. The glass container was put in an oven as is and heated at 380° C. for 3 hours. Thereafter, the heated glass container was taken out from the oven, and cooled to room temperature; and the degree of corrosion of the surface of the metal post was visually observed. The degree of corrosion was judged based on the following criteria.

Good: no corrosion observed

Fair: corrosion slightly observed

Poor: corrosion observed

TABLE 4

| | Type of copolymer | Water vapor permeability g/m² | Haze value % | Storage elastic modulus at 150° C. MPa | Tensile creep strain at 240° C. | Electrolytic solution immersion test Amount of fluorine ions dissolving out (ppm by mass) | Chemical immersion crack test | Electrolytic solution permeability g/m² | Abrasion loss at 150° C. (mg) | Tensile strength after 100,000 cycles (mN/mm²) | Mold corrosion test HPM38 (Cr plated) | HPM38 (Ni plated) |
|---|---|---|---|---|---|---|---|---|---|---|---|---|
| Experimental Example 1 | Synthesis Example 1 | 466 | 6.7 | 87 | 3.77 | 0.6 | Good | 265 | 44.4 | 361 | Good | Good |
| Experimental Example 2 | Synthesis Example 2 | 464 | 6.6 | 84 | 3.98 | 0.6 | Good | 266 | 43.8 | 340 | Good | Good |
| Experimental Example 3 | Synthesis Exemple 3 | 456 | 6.7 | 88 | 4.23 | 0.6 | Good | 260 | 45.3 | 332 | Good | Good |
| Experimental Example 4 | Synthesis Example 4 | 480 | 6.4 | 84 | 4.47 | 0.6 | Good | 265 | 43.6 | 303 | Good | Good |
| Experimental Example 5 | Synthesis Example 5 | 504 | 6.1 | 83 | 4.60 | 0.6 | Good | 275 | 41.8 | 290 | Good | Good |
| Experimental Example 6 | Synthesis Exemple 6 | 472 | 6.5 | 84 | 3.77 | 0.6 | Good | 269 | 42.9 | 347 | Good | Good |
| Comparative Experimental Example 1 | Synthesis Example 7 | 388 | 7.7 | 97 | 3.88 | 0.6 | Poor | 234 | 68.0 | 437 | Good | Good |
| Comparative Experimental Exemple 2 | Synthesis Example 8 | 408 | 7.5 | 95 | 3.27 | 0.6 | Poor | 251 | 49.1 | 437 | Good | Good |
| Comparative Experimental Example 3 | Synthesis Example 9 | 484 | 6.4 | 83 | 5.27 | 1.6 | Good | 305 | 43.6 | 346 | Poor | Poor |
| Comparative Experimental Example 4 | Synthesis Example 10 | 544 | 7.6 | 75 | 4.35 | 0.6 | Good | 288 | 39.0 | 258 | Good | Good |
| Comparative Experimental Example 5 | Synthesis Example 11 | 564 | 6.2 | 72 | 6.98 | 0.6 | Good | 286 | 37.5 | 167 | Good | Good |

Experimental Examples 7 to 12 and Comparative Experimental Examples 6 to 10

The copolymer described in Table 5 was injection molded by using an injection molding machine (SE50EV-A, manufactured by Sumitomo Heavy Industries, Ltd.) set at a cylinder temperature of 380° C., a mold temperature of 200° C. and an injection speed of 10 mm/s. The mold used was a mold (spiral flow, 10 mm in width, 0.5 mmt, 1 mmt, or 3 mmt in thickness) Cr plated on HPM38. The length (flow length) of the obtained injection molded article was measured, and the ratio of the flow length to the thickness (flow length/thickness) was calculated. The appearance of the obtained injection molded article was visually observed and evaluated according to the following criteria. The results are shown in Table 5.

Good: the surface is smooth and excellent in the transparency, and makes a beautiful impression Fair: poor appearance such as a scratch was observed in the region of 10% or less of the surface, but the remaining region of the surface is smooth and is also excellent in the transparency Poor: poor appearance such as a scratch was observed in the region of more than 10% of the surface Further, the distance from the gate section of the obtained injection molded article to the edge of the injection molded article (the maximum flow length (a)) was measured. Then, the average value of the product thickness on the maximum flow length (b) and the ratio ((a)/(b)) were determined by measuring the minimum diameter of a cross section of the injection molded article orthogonal to a line drawn to measure the maximum flow length of the injection molded article (the product thickness on the maximum flow length) for every 2 mm along the line drawn to measure the maximum flow length, integrating the measured values, and calculating the average of the measured values. The results are shown in Table 5.

TABLE 5

| | | Spiral flow | | | | | | | | |
|---|---|---|---|---|---|---|---|---|---|---|
| | | 0.5 mmt | | | 1 mmt | | | 3 mmt | | |
| | Type of copolymer | Flow length (a) (mm) | Ratio a/b | Appearance | Flow length (a) (mm) | Ratio a/b | Appearance | Flow length (a) (mm) | Ratio a/b | Appearance |
| Experimental Example 7 | Synthesis Example 1 | 47 | 94 | Fair | 108 | 108 | Good | 373 | 124 | Good |
| Experimental Example 8 | Synthesis Example 2 | 48 | 96 | Fair | 110 | 110 | Good | 377 | 126 | Good |

TABLE 5-continued

| | | Spiral flow | | | | | | | | |
|---|---|---|---|---|---|---|---|---|---|---|
| | | 0.5 mmt | | | 1 mmt | | | 3 mmt | | |
| | Type of copolymer | Flow length (a) (mm) | Ratio a/b | Appearance | Flow length (a) (mm) | Ratio a/b | Appearance | Flow length (a) (mm) | Ratio a/b | Appearance |
| Experimental Example 9 | Synthesis Example 3 | 53 | 106 | Good | 120 | 120 | Good | 412 | 137 | Good |
| Experimental Example 10 | Synthesis Example 4 | 51 | 102 | Fair | 116 | 118 | Good | 398 | 133 | Good |
| Experimental Example 11 | Synthesis Example 5 | 48 | 96 | Fair | 110 | 110 | Good | 377 | 126 | Good |
| Experimental Example 12 | Synthesis Example 6 | 45 | 90 | Fair | 100 | 100 | Fair | 372 | 124 | Good |
| Comparative Experimental Example 6 | Synthesis Example 7 | 85 | 170 | Good | 192 | 192 | Good | over measurement limit | — | Good |
| Comparative Experimental Example 7 | Synthesis Example 8 | 51 | 102 | Fair | 117 | 117 | Good | 401 | 134 | Good |
| Comparative Experimental Example 8 | Synthesis Example 9 | 50 | 100 | Fair | 115 | 115 | Good | 394 | 131 | Good |
| Comparative Experimental Example 9 | Synthesis Example 10 | 37 | 74 | Poor | 93 | 93 | Poor | 366 | 122 | Good |
| Comparative Experimental Example 10 | Synthesis Example 11 | 48 | 96 | Fair | 110 | 110 | Good | 377 | 126 | Good |

Experimental Examples 13 to 15

The copolymer described in Table 6 was injection molded by using an injection molding machine (SE50EV-A, manufactured by Sumitomo Heavy Industries, Ltd.) set at a cylinder temperature of 400° C., a mold temperature of 200° C. and an injection speed of 30 mm/s, to thereby obtain an injection molded article. The mold used was a mold (flat plate, 155 mm×100 mm, 1.5 mmt in thickness, two side gates, the gates were mounted at positions 25 mm and 75 mm from the edge of the 100 mm side) Cr plated on HPM38. In the obtained injection molded article, a weld section was formed on the weld section at the center between the gates. The closer to the gate, the deeper the formed weld section, and the more distant from the gate, the shallower the formed weld section.

Figure 2:
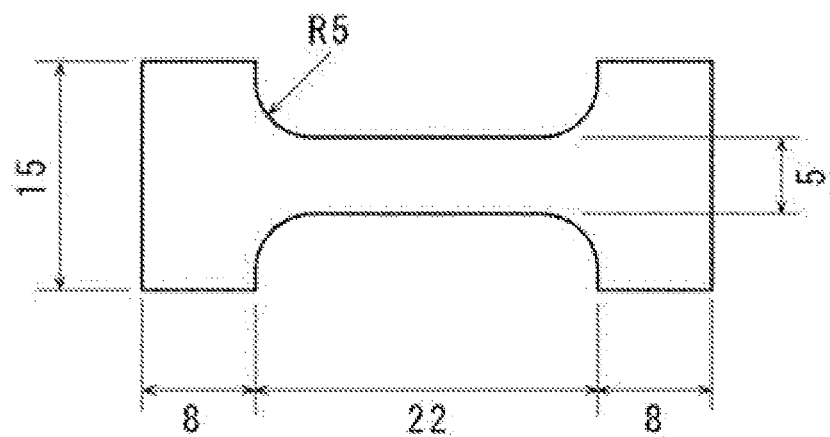
FIG. 2 is a diagram of the shape of a micro dumbbell shape test piece.

As shown in FIG. 1, the weld section 12 in the middle between two positions 11 of the obtained injection molded article 10 which correspond to the gates of the mold is taken as the center, and test pieces were sequentially punched from the injection molded article 10 along the weld section 12 by using a dumbbell cutter 13 to prepare a plurality of micro dumbbell shape test pieces shown in FIG. 2.

The weld depth of the weld section positioned in the middle of the micro dumbbell shape test piece on the gate side (corresponding to "the maximum depth of the weld section (D)") was measured, and the ratio of the maximum depth of the weld section (D) to the maximum thickness of the micro dumbbell shape test piece (L) (in the present experimental example, 1.5 mmt), (weld ratio (D/L)), was determined.

In the tensile test, a tensilon universal tester (RTC-1225A manufactured by ORIENTEC CO., LTD.) was used, and the tensile test was carried out at a distance between chucks of 22 mm and a tensile rate of 50 mm/min to measure the maximum point stress (tensile strength).

The relationship between the weld ratio (D/L) and the tensile strength are shown in Table 6.

TABLE 6

| | | Tensile strength (MPa) | | | | | | | | |
|---|---|---|---|---|---|---|---|---|---|---|
| | Type of copolymer | D/L = 0.20 | D/L = 0.21 | D/L = 0.22 | D/L = 0.41 | D/L = 0.42 | D/L = 0.60 | D/L = 0.61 | D/L = 0.62 | D/L = 0.86 |
| Experimental Example 13 | Synthesis Example 3 | 25.3 | | | 23.4 | | 21.1(*) | | | 16.0(*) |
| Experimental Example 14 | Synthesis Example 5 | | 24.8 | | | 23.0 | | 20.8(*) | | 15.8(*) |
| Experimental Example 15 | Synthesis Example 6 | | | 25.0 | | 23.1 | | | 21.0(*) | 15.9(*) |

(*)The weld section was broken.

The invention claimed is:

1. An injection molded article obtained by injection molding a copolymer using a mold provided with a gate, wherein the copolymer comprises tetrafluoroethylene (TFE) unit and a fluoro(alkyl vinyl ether) (FAVE) unit, a content of the fluoro(alkyl vinyl ether) unit of the copolymer is 5.2 to 6.3% by mass with respect to the whole of the monomer units, a melt flow rate at 372° C. of the copolymer is 19.0 to 35.0 g/10 min, the total number of —CF=$CF_2$, —$CF_2H$, —COF, —COOH, —$COOCH_3$, —$CONH_2$ and —$CH_2OH$ of the copolymer is 50 or less per $10^6$ main-chain carbon atoms, the injection molded article has a gate section corresponding to the gate of the mold, and a ratio of a maximum flow length (a) from the gate section of the injection molded article to an average value (b) of a product thickness on the maximum flow length, ((a)/(b)), is 80 to 200.

2. The injection molded article according to claim 1, wherein the fluoro(alkyl vinyl ether) unit of the copolymer is perfluoro(propyl vinyl ether) unit.

3. The injection molded article according to claim 1, wherein a content of the fluoro(alkyl vinyl ether) unit of the copolymer is 5.4 to 6.1% by mass with respect to the whole of the monomer units.

4. The injection molded article according to claim 1, wherein the melt flow rate at 372° C. of the copolymer is 20.0 to 30.9 g/10 min.

5. The injection molded article according to claim 1, wherein a melting point of the copolymer is 295 to 305° C.

6. The injection molded article according to claim 1, wherein the injection molded article further has a weld section, and a ratio of a maximum depth (D) of the weld section to a maximum thickness (L) of the injection molded article, (D/L), is 0.8 or less.

7. A method for producing the injection molded article according to claim 1, the method comprising:

injection molding the copolymer by using an injection molding machine and the mold provided with the gate, wherein a ratio of a maximum flow length (c) from the gate of the mold to an average value (d) of a cavity thickness of the mold on the maximum flow length, ((c)/(d)), is 80 to 200.

8. The production method according to claim 7, wherein a temperature of the mold is 150 to 250° C.

9. The production method according to claim 7, wherein a cylinder temperature of the injection molding machine is 350 to 420° C.

* * * * *